US012783186B2

(12) United States Patent
Tagawa

(10) Patent No.: US 12,783,186 B2
(45) Date of Patent: Nov. 3, 2026

(54) STORAGE MEDIUM THAT STORES CONTROL PROGRAM CAPABLE OF SUPPRESSING OCCURRENCE OF PRINTING ERRORS IN PRINTING DEVICE REGARDLESS OF SIZE OF PRINT DATA EVEN IN CASE OF USING PROGRAM THAT RUNS BASED ON, FOR EXAMPLE, IPP, CONTROL METHOD FOR INFORMATION PROCESSING APPARATUS, AND INFORMATION PROCESSING APPARATUS

(71) Applicant: CANON KABUSHIKI KAISHA, Tokyo (JP)

(72) Inventor: Reo Tagawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 230 days.

(21) Appl. No.: 18/677,786

(22) Filed: May 29, 2024

(65) Prior Publication Data

US 2024/0427536 A1 Dec. 26, 2024

(30) Foreign Application Priority Data

Jun. 21, 2023 (JP) ................................ 2023-101811

(51) Int. Cl.
*G06F 3/12* (2006.01)

(52) U.S. Cl.
CPC .......... *G06F 3/1225* (2013.01); *G06F 3/1208* (2013.01); *G06F 3/121* (2013.01); *G06F 3/1256* (2013.01)

(58) Field of Classification Search
None
See application file for complete search history.

(56) References Cited

U.S. PATENT DOCUMENTS

2007/0285725 A1* 12/2007 Kitahara ................ G07F 17/42 358/1.18
2013/0141738 A1* 6/2013 Shibata ................ G03G 15/502 358/1.2

(Continued)

FOREIGN PATENT DOCUMENTS

JP 2005301888 A * 10/2005
JP 2006004248 A * 1/2006
JP 2022-100565 7/2022

OTHER PUBLICATIONS

Akatsuchi Yukinobu, JP2006004248A English Translation (Year: 2006).*
Yasuda Masanao, JP2005301888A English Translation (Year: 2005).*

*Primary Examiner* — Miya J Cato
(74) *Attorney, Agent, or Firm* — Venable LLP

(57) ABSTRACT

A non-transitory computer-readable storage medium storing a control program that controls an information processing apparatus that is communicably connected to a printing device, which performs printing, and is capable of processing information to and from the printing device, and causes the information processing apparatus to execute the following steps is provided. The control program includes software code adapted to perform an obtaining step of obtaining a pixel number corresponding to a size of a sheet-shaped print medium on which print data used in the printing is printed, and a generating step of, in a case that the pixel number obtained in the obtaining step is greater than or equal to a pixel number threshold value set in advance, using the print data as primary data and lowering a resolution of the primary data to generate secondary data, a volume of which is smaller than a volume of the primary data.

20 Claims, 19 Drawing Sheets

(56) References Cited

U.S. PATENT DOCUMENTS

| | | | | |
|---|---|---|---|---|
| 2018/0220010 | A1* | 8/2018 | Hasegawa ................ | H04N 1/21 |
| 2022/0206727 | A1 | 6/2022 | Narita ................... | G06F 3/1255 |
| 2023/0061074 | A1* | 3/2023 | Shiohara ............... | G06F 3/1206 |
| 2023/0273759 | A1* | 8/2023 | Shibuya ................ | G06F 3/1232<br>358/1.14 |
| 2024/0264782 | A1* | 8/2024 | Sawada ................. | G06F 3/1204 |
| 2025/0341990 | A1* | 11/2025 | Narita ....................... | G06T 3/40 |
| 2025/0348250 | A1* | 11/2025 | Narita ................... | G06F 3/1206 |
| 2026/0003548 | A1* | 1/2026 | Ichikawa .............. | G06F 3/1205 |
| 2026/0003551 | A1* | 1/2026 | Ichikawa .............. | G06F 3/1207 |

* cited by examiner

FIG. 5

501

```
<?xml version="1.0" encoding="utf-8"?>
<PrintDeviceCapabilities...>
    ...
    <psk:PageMediaSize psf2:psftype="Feature">                                  502
      <psk:ISOA4 psf2:psftype="Option" psf2:default="true">
       <psk12:PortraitImageableSize...>0,0,210000,297000</psk12:PortraitImageableSize>
       <psk:MediaSizeHeight xsi:type="xsd:integer" psf2:psftype="ScoredProperty">297000</psk:MediaSizeHeight>
       <psk:MediaSizeWidth xsi:type="xsd:integer" psf2:psftype="ScoredProperty">210000</psk:MediaSizeWidth>
      </psk:ISOA4>
    ...
      <psk:Poster44x64 psf2:psftype="Option">
       <psk12:PortraitImageableSize ...>0,0,1117600,1574800</psk12:PortraitImageableSize>
       <psk:MediaSizeHeight xsi:type="xsd:integer" psf2:psftype="ScoredProperty">1574800</psk:MediaSizeHeight>
       <psk:MediaSizeWidth xsi:type="xsd:integer" psf2:psftype="ScoredProperty">1117600</psk:MediaSizeWidth>
      </ psk:Poster44x64 >
    <psk:PageMediaType psf2:psftype="Feature">                                  503
      <psk:Plain psf2:psftype="Option" psf2:default=" true" />
      <psk:Photographic psf2:psftype="Option" psf2:default="false" />
    </psk:PageMediaType>
    <psk:PageOrientation psf2:psftype="Feature">                                504
      <psk:Portrait psf2:psftype="Option" psf2:default="true" />
      <psk:Landscape psf2:psftype="Option" psf2:default="false" />
    </psk:PageOrientation>
    ...
</PrintDeviceCapabilities>
```

FIG. 6

601

```
<?xml version="1.0" encoding="utf-8"?>
<PrintDeviceCapabilities...>
      ...
    <psk:PageMediaSize psf2:psftype="Feature">
      <psk:ISOA4 psf2:psftype="Option" psf2:default="true">
       <psk12:PortraitImageableSize...>0,0,210000,297000</psk12:PortraitImageableSize>
       <psk:MediaSizeHeight xsi:type="xsd:integer" psf2:psftype="ScoredProperty">297000</psk:MediaSizeHeight>
       <psk:MediaSizeWidth xsi:type="xsd:integer" psf2:psftype="ScoredProperty">210000</psk:MediaSizeWidth>
      </psk:ISOA4>
    ...
      <psk:Poster44x64 psf2:psftype="Option">
       <psk12:PortraitImageableSize ...>0,0,1117600,1574800</psk12:PortraitImageableSize>
       <psk:MediaSizeHeight xsi:type="xsd:integer" psf2:psftype="ScoredProperty">1574800</psk:MediaSizeHeight>
       <psk:MediaSizeWidth xsi:type="xsd:integer" psf2:psftype="ScoredProperty">1117600</psk:MediaSizeWidth>
      </ psk:Poster44x64 >
    <psk:PageMediaType psf2:psftype="Feature">
      <psk:Plain psf2:psftype="Option" psf2:default=" true" />
      <psk:Photographic psf2:psftype="Option" psf2:default="false" />
    </psk:PageMediaType>
    <psk:PageOrientation psf2:psftype="Feature">
      <psk:Portrait psf2:psftype="Option" psf2:default="true" />
      <psk:Landscape psf2:psftype="Option" psf2:default="false" />
    </psk:PageOrientation>
    ...
    <nsXXX:JobPixelNumberLimitation psf2:psftype="Feature">
      <nsXXX:Auto psf2:psftype="Option" psf2:default="true" />
      <nsXXX:ON psf2:psftype="Option" psf2:default="false" />
      <nsXXX:OFF psf2:psftype="Option" psf2:default="false" />
    </nsXXX:JobPixelNumberLimitation>
    ...
</PrintDeviceCapabilities>
```

502

503

504

602

*FIG. 9*

901

| NAME OF RENDERING APPLICATION | PIXEL NUMBER THRESHOLD VALUE (dot) |
|---|---|
| Fine CAD Creater | None |
| Archtecture 3D | 100000 |
| Speed Poster Designer 3 | 80000 |
| Speed Poster Designer 2 | 64000 |
| etc. | 32000 |

FIG. 14

1401

```
<?xml version="1.0" encoding="utf-8"?>
<PrintDeviceCapabilities...>
      ...
    <psk:PageMediaSize psf2:psftype="Feature">
      <psk:ISOA4 psf2:psftype="Option" psf2:default="true">
        <psk12:PortraitImageableSize...>0,0,210000,297000</psk12:PortraitImageableSize>
        <psk:MediaSizeHeight xsi:type="xsd:integer" psf2:psftype="ScoredProperty">297000</psk:MediaSizeHeight>
        <psk:MediaSizeWidth xsi:type="xsd:integer" psf2:psftype="ScoredProperty">210000</psk:MediaSizeWidth>
      </psk:ISOA4>
    ...
      <psk:Poster44x64 psf2:psftype="Option">
        <psk12:PortraitImageableSize ...>0,0,1117600,1574800</psk12:PortraitImageableSize>
        <psk:MediaSizeHeight xsi:type="xsd:integer" psf2:psftype="ScoredProperty">1574800</psk:MediaSizeHeight>
        <psk:MediaSizeWidth xsi:type="xsd:integer" psf2:psftype="ScoredProperty">1117600</psk:MediaSizeWidth>
      </ psk:Poster44x64 >
    <psk:PageMediaType psf2:psftype="Feature">
      <psk:Plain psf2:psftype="Option" psf2:default=" true" />
      <psk:Photographic psf2:psftype="Option" psf2:default="false" />
    </psk:PageMediaType>
    <psk:PageOrientation psf2:psftype="Feature">
      <psk:Portrait psf2:psftype="Option" psf2:default="true" />
      <psk:Landscape psf2:psftype="Option" psf2:default="false" />
    </psk:PageOrientation>
    ...
    <nsXXX:JobPixelNumberLimitation psf2:psftype="Feature">
      <nsXXX:Auto psf2:psftype="Option" psf2:default="true" />
      <nsXXX:ON psf2:psftype="Option" psf2:default="false" />
      <nsXXX:OFF psf2:psftype="Option" psf2:default="false" />
    </nsXXX:JobPixelNumberLimitation>
    <nsXXX:JobMinimumResolution psf2:psftype="Feature">
      <nsXXX:None psf2:psftype="Option" psf2:default="true" />
      <nsXXX:300dpi psf2:psftype="Option" psf2:default="false" />
      <nsXXX:150dpi psf2:psftype="Option" psf2:default="false" />
      <nsXXX:75dpi   psf2:psftype="Option" psf2:default="false" />
    </nsXXX:JobPixelNumberLimitation>
    ...
</PrintDeviceCapabilities>
```

502, 503, 504, 602, 1402

STORAGE MEDIUM THAT STORES CONTROL PROGRAM CAPABLE OF SUPPRESSING OCCURRENCE OF PRINTING ERRORS IN PRINTING DEVICE REGARDLESS OF SIZE OF PRINT DATA EVEN IN CASE OF USING PROGRAM THAT RUNS BASED ON, FOR EXAMPLE, IPP, CONTROL METHOD FOR INFORMATION PROCESSING APPARATUS, AND INFORMATION PROCESSING APPARATUS

BACKGROUND OF THE INVENTION

Field of the Invention

The present invention relates to a storage medium that stores a control program, a control method for an information processing apparatus, and an information processing apparatus.

Description of the Related Art

A host computer (an information processing apparatus) capable of processing information to and from a printing device is communicably connected to the printing device that performs printing. As control software for controlling the printing device, for example, a printer driver installed from the printing device into the host computer is used. This printer driver allows the host computer to issue a printing instruction to the printing device. An operating system (hereinafter, referred to as “an OS”), which is basic software, has been installed in advance into the host computer. The printer driver is configured in accordance with the specifications defined by the OS, and is able to operate by being called out from the OS. In addition, such printer drivers differ depending on vendors that supply printing devices, that is, they are model-specific printer drivers suitable for each printing device.

In recent years, Windows (registered trademark) provides a standard class driver (hereinafter, sometimes referred to as “a standard driver”) that can be used in common even for printing devices supplied by a plurality of different vendors. Such a standard driver has been built into the OS in advance. Furthermore, it is possible to use the standard driver by connecting any printing device to the host computer having the OS, into which the standard driver has been built. As a result, it is possible to omit installing the model-specific printer driver. In addition, the standard driver is able to be used in designating a print function on the printing device according to print device capabilities (hereinafter, referred to as “PDC”) generated based on information obtained from the printing device. As a result, it is possible to designate the print function for each printing device by using one standard driver. A function extension application (hereinafter, sometimes referred to as “an extended application”) that extends functions can be associated with the standard driver. The extended application is provided by each vendor.

Japanese Laid-Open Patent Publication (kokai) No. 2022-100565 discloses a technique in which an extended application compares first sheet information regarding a sheet used for printing performed by a printing device with second sheet information regarding a sheet on a print setting for setting printing conditions on the printing device to determine the suitability of the sheet. Depending on the size of the sheet, there is a risk that an image extends beyond the sheet, resulting in printing that is not intended by a user, that is, there is a risk that rendering errors occur, but with the technique disclosed in Japanese Laid-Open Patent Publication (kokai) No. 2022-100565, it is possible to reduce the rendering errors.

However, functions for suppressing the occurrence of the rendering errors such as missing of rendering objects and for suppressing deterioration of image quality are not sufficient.

SUMMARY OF THE INVENTION

The present invention provides a storage medium that stores a control program capable of suppressing the occurrence of printing errors in a printing device regardless of the size of print data even in the case of using a program that runs based on, for example, the IPP, a control method for an information processing apparatus, and an information processing apparatus.

Accordingly, the present invention provides a non-transitory computer-readable storage medium storing a control program that controls an information processing apparatus that is communicably connected to a printing device, which performs printing, and is capable of processing information to and from the printing device, and causes the information processing apparatus to execute the following steps, the control program comprising software code adapted to perform an obtaining step of obtaining a pixel number corresponding to a size of a sheet-shaped print medium on which print data used in the printing is printed, and a generating step of, in a case that the pixel number obtained in the obtaining step is greater than or equal to a pixel number threshold value set in advance, using the print data as primary data and lowering a resolution of the primary data to generate secondary data, a volume of which is smaller than a volume of the primary data.

According to the present invention, it is possible to suppress the occurrence of the printing errors in the printing device regardless of the size of the print data even in the case of using the program that runs based on, for example, the IPP.

Further features of the present invention will become apparent from the following description of exemplary embodiments with reference to the attached drawings.

BRIEF DESCRIPTION OF THE DRAWINGS

FIG. 5 is a diagram that shows an example of PDC.

FIG. 6 is a diagram that shows an example of the PDC to which information indicating a pixel number limit function is added.

FIG. 9 is a diagram that shows an example of a pixel number threshold value table of a rendering application.

FIG. 14 is a diagram that shows an example of the PDC to which information indicating a minimum resolution designating function is added.

DESCRIPTION OF THE EMBODIMENTS

The present invention will now be described in detail below with reference to the accompanying drawings showing embodiments thereof.

Hereinafter, each embodiment of the present invention will be described in detail with reference to the drawings. However, the configuration described in each embodiment below is merely an example, and the scope of the present invention is not limited by the configuration described in each embodiment. For example, each unit (each component) constituting the present invention can be replaced with a unit (a component) with any configuration that can perform the same function. In addition, any components may be added. Furthermore, any two or more configurations (features) of each embodiment can be combined.

Figure 1:
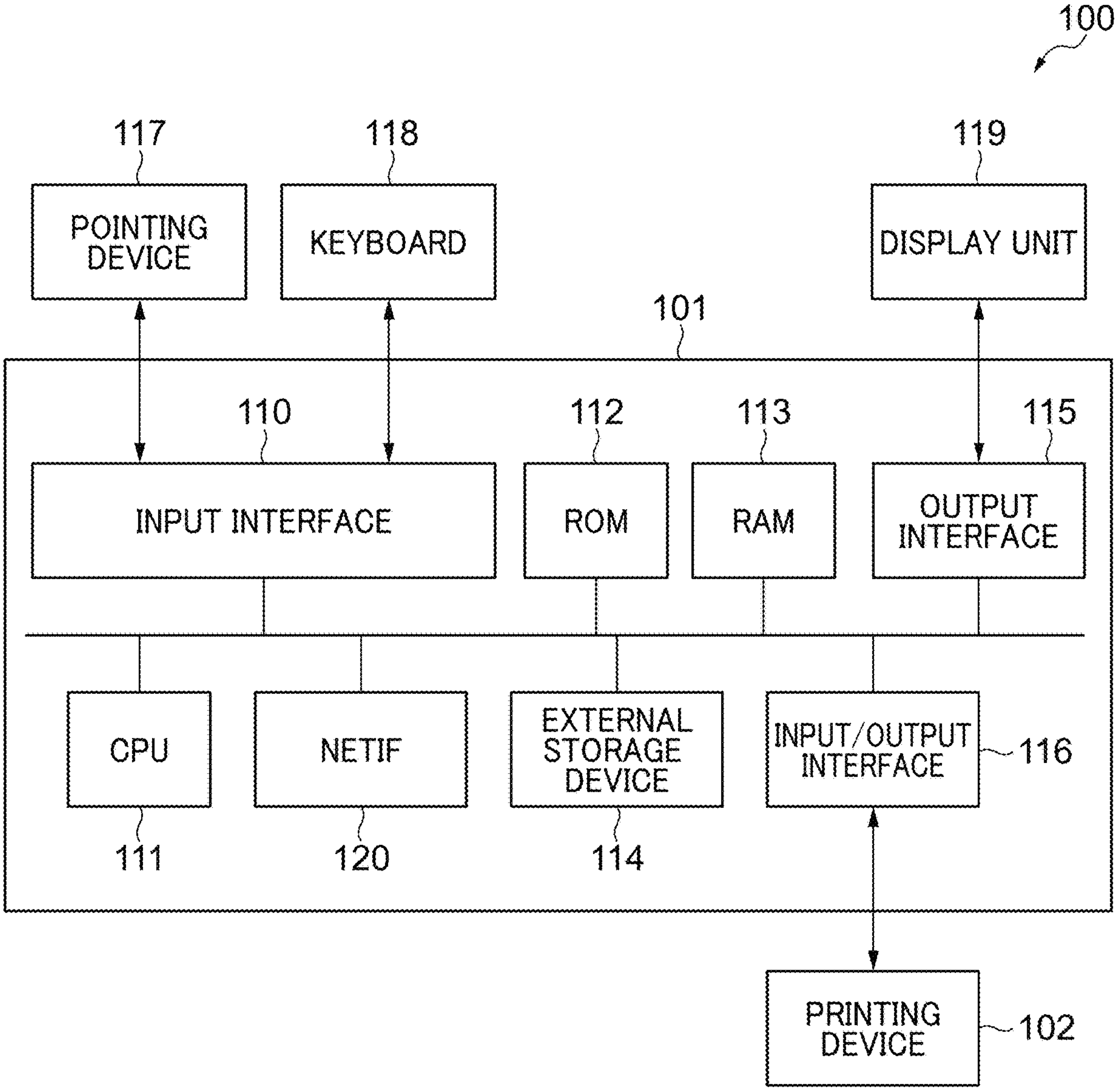
FIG. 1 is a block diagram that shows a hardware configuration of a printing system according to a first embodiment.

A first embodiment of the present invention will be described below with reference to FIGS. 1 to 12. FIG. 1 is a block diagram that shows a hardware configuration of a printing system according to the first embodiment. As shown in FIG. 1, a printing system 100 includes a host computer 101, a printing device 102, a display unit 119, a pointing device 117, and a keyboard 118. The host computer 101 is an information processing apparatus that is communicably connected to the printing device 102, the display unit 119, the pointing device 117, and the keyboard 118, and is able to process information to and from the printing device 102, the display unit 119, the pointing device 117, and the keyboard 118. The host computer 101 includes an input interface 110, a central processing unit (a CPU) 111, a read only memory (a ROM) 112, a random access memory (a RAM) 113, an external storage device 114, an output interface 115, an input/output interface 116, and a NETIF 120. The ROM 112 stores an initialization program. The external storage device 114 stores an application program group (a group of application programs), an operating system (an OS), print data generation software, and other various kinds of data. In the present embodiment, it is assumed that Windows (registered trademark) 10 by Microsoft (registered trademark) has been installed as the OS. The RAM 113 is used as a working memory or the like when executing various kinds of programs stored in the external storage device 114, and the various kinds of programs are able to run within the host computer 101. The various kinds of programs include, for example, two control programs that control the host computer 101. One control program of the two control programs is a program that runs based on the internet printing protocol (the IPP). The one control program is print data generation software 202, which will be described below. In addition, the other control program of the two control programs is a program that extends functions of the program that runs based on the IPP, and causes the host computer 101 to execute respective steps (a control method for the information processing apparatus). The other control program is an extended application (printing software) 204 that will be described below. Information can be exchanged between the print data generation software 202 and the extended application 204.

The keyboard 118 and the pointing device 117 are connected to the input interface 110. The keyboard 118 and the pointing device 117 are input devices for inputting information and the like. The display unit 119 is connected to the output interface 115. The display unit 119 is, for example, a display device that displays images and the like. The NETIF 120 is a network interface, and performs control for performing data transfer with an external device (not shown) via a network (not shown). It should be noted that in the printing system 100, as an apparatus that includes all of the host computer 101, the pointing device 117, the keyboard 118, and the display unit 119, for example, a desktop or notebook personal computer, a tablet terminal, a smartphone, or the like can be used.

The printing device 102 is connected to the input/output interface 116. The printing device 102 is able to print, onto a sheet-shaped print medium, print data that is generated by the host computer 101 and is used for printing. Although depending on the type of the printing device 102, examples of the print medium include an A-size print sheet, a B-size print sheet, a roll sheet, etc., all of which are rectangular in a plan view. In addition, in the present embodiment, the printing device 102 is an inkjet printer that performs printing by ejecting ink onto a print medium, but is not limited thereto, and may be, for example, a printer that performs printing by using an electrophotographic method. It should be noted that although the host computer 101 and the printing device 102 are configured separately from each other in the configuration shown in FIG. 1, the host computer 101 and the printing device 102 are not limited to this, and for example, may be configured integrally as one apparatus.

Figure 2A:
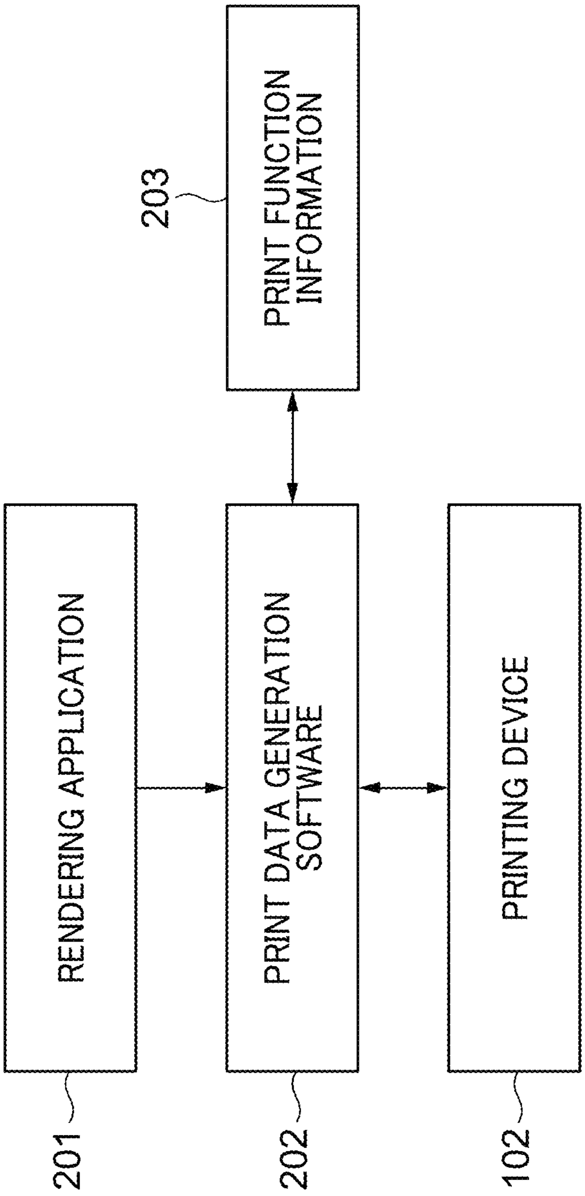
FIG. 2A and FIG. 2B are block diagrams that show configurations centered on software of the printing system shown in FIG. 1.
Figure 2B:
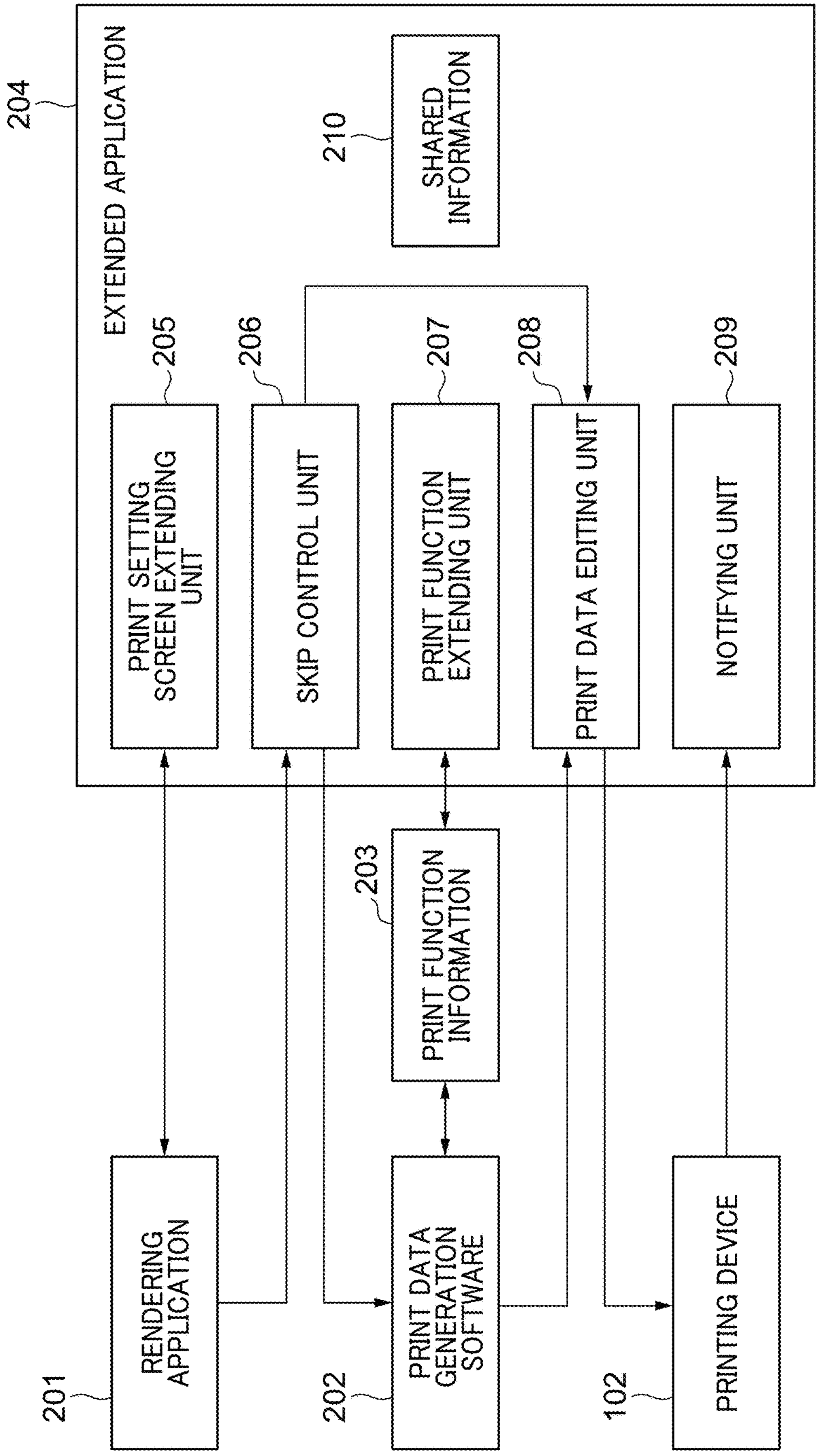

Next, the configuration of the printing system centered on software will be described. FIG. 2A and FIG. 2B are block diagrams that show configurations centered on software of the printing system shown in FIG. 1. FIG. 2A is a diagram that shows a general configuration in the case that the extended application has not been associated with the print data generation software and the printing device. Furthermore, FIG. 2B is a diagram that shows a configuration in the case that the extended application has been associated with the print data generation software and the printing device.

As shown in FIG. 2A, the print data generation software 202 is capable of exchanging information with a rendering application 201 and the printing device 102, respectively, that is, the print data generation software 202 is capable of transmitting and receiving information to and from the rendering application 201 and the printing device 102, respectively. The rendering application 201 is software that creates contents (print data) to be printed by the printing device 102. The rendering application 201 is not particularly limited, and examples of the rendering application 201 include, for example, a document creation application, a spreadsheet application, etc. The rendering application 201 issues a printing instruction to the OS by receiving a printing request from a user, for example, via the keyboard 118. The printing instruction includes print setting information for instructing the operations of the print data generation software 202 and the printing device 102. The print setting information is also referred to as "a print ticket (a PT)". In addition, in order to output the print setting information, the rendering application 201 is able to cause to display a print setting screen provided by any one of the print data generation software 202, the OS, and the rendering application 201. The print setting screen includes setting items indicating print functions that can be set and control items indicating their setting values, according to capability information obtained from the print data generation software 202, that is, information that can be set as a print setting. The capability information is also referred to as "print capabilities" (hereinafter, sometimes referred to as "PC").

The print data generation software 202 determines the PC based on print function information 203. The print function information 203 is data indicating print functions in which all settable print functions, their setting values, exclusive relationships between the setting values, and the like have been described. The print function information 203 is also referred to as "print device capabilities (PDC)". The print function information 203 is included in the configuration file of the print data generation software 202 and is placed in the external storage device 114 as an unchangeable file. Alternatively, the print function information 203 is dynamically generated by the print data generation software 202. Specifically, the print data generation software 202 obtains attribute data of the printing device 102 from the printing device 102. The print data generation software 202 generates the print function information 203 according to attribute information within this attribute data. It should be noted that in the case that the print function information 203 is dynamically generated in this way, editing of the print function information 203 is possible. In addition, the attribute data of the printing device 102 is a response obtained by issuing an IPP "Get-Printer-Attributes" operation to the printing device 102. The response includes attribute information indicating functions that can be designated in the printing device 102, that is, capabilities of the printing device 102, and setting values related to the attribute information. In addition, the response is stored in the RAM 113.

With such a configuration, the print data generation software 202 allows the user to designate print functions that can be used in the printing device 102, depending on the printing device 102 connected to the print data generation software 202. As a result, regardless of the printing device 102 connected to the print data generation software 202, that is, even in the case that a printing device with different functions or a printing device developed by a different printer vendor is connected, it becomes possible to designate print functions that can be used in the printing device with different functions or the printing device developed by the different printer vendor. It should be noted that in the present embodiment, it is assumed that the print data generation software 202 is configured to use "IPP Class Driver" installed in Windows (registered trademark) 10. "IPP Class Driver" is a printer driver that executes a print processing according to the specifications of a standard printing protocol called the IPP, and is bundled with the package of the OS. "IPP Class Driver" is not a unique printer driver depending on the model of the printing device 102, but a standard class driver that can be used in common in a plurality of printing devices 102. In addition, "IPP Class Driver" obtains capability information of the printing device 102, and generates the print function information 203 based on the capability information of the printing device 102. As a result, by using the host computer 101, it is possible to designate print functions that can be executed by the printing device 102.

The OS generates intermediate data (sometimes referred to as "input data") based on the printing instruction outputted from the rendering application 201 and transmits it to the print data generation software 202. The data that the rendering application 201 outputs for printing is not particularly limited, and for example, is preferably data in an XML Paper Specification format (an XPS format). In addition, the data that the rendering application 201 outputs for printing may be data in a Graphic Device Interface format (a GDI format). In the case that the print data generation software 202 uses "IPP Class Driver", if the data that the rendering application 201 outputs is data in the GDI format, the OS converts the data in the GDI format into data in the XPS format. Then, the OS transmits the converted data in the XPS format to the print data generation software 202 as the intermediate data. In addition, if the data that the rendering application 201 outputs is data in the XPS format, the OS transmits the data in the XPS format to the print data generation software 202 as the intermediate data. It should be noted that the intermediate data includes rendering data, which is information such as characters and figures that are formed on the print medium, and the print setting information set by the user.

The print data generation software 202 converts the intermediate data into the print data that can be processed by the printing device 102 and transmits it to the printing device 102. It should be noted that the print data is generated based on the content of the intermediate data. That is, similar to the intermediate data, the print data includes the rendering data, which is the information such as characters and figures that are formed on the print medium, and print setting attribute information, which is generated based on the print setting information set by the user and designates the print setting. The print setting attribute information includes the attribute information indicating the functions that can be designated in the printing device 102, that is, the capabilities of the printing device 102, and the setting values related to the attribute information.

The printing device 102 performs printing on the print medium based on the print data transmitted from the print data generation software 202. At this time, the printing device 102 is able to form the rendering data included in the print data on the print medium by performing an operation according to the print setting attribute information included in the print data. It should be noted that the print setting attribute information includes, for example, attribute information for designating print quality such as image quality priority or speed priority, double-sided printing or single-sided printing, etc., and setting values of the attribute information. For example, in the case that the print setting attribute information includes attribute information designating double-sided printing, the printing device 102 is able to execute double-sided printing.

As shown in FIG. 2B, unlike FIG. 2A, the extended application 204 has been added. The extended application 204 is software for extending the functions of the print data generation software 202. It should be noted that the extended application 204 is software that is not included in the OS in advance (is not bundled with the OS). Therefore, the extended application 204 is downloaded from a server (not shown) via the Internet by the user operating the host computer 101, and is installed into the host computer 101. Alternatively, when the printing device 102 is connected to the host computer 101, the extended application 204 may be automatically installed into the host computer 101 based on this connection. Specifically, in the case that the printing device 102 is connected to the host computer 101, the OS obtains device identification information from the printing device 102. The OS may download the extended application 204 corresponding to this device identification information from the server via the Internet and then install it. As a result, the print data generation software 202 and the extended application 204 are held in the host computer 101 as separate control programs. It should be noted that the print data generation software 202 and the extended application 204 may be updated and upgraded, respectively. In this case, the update processing of the print data generation software 202 and the update processing of the extended application 204 may be performed at the same timing or at different timings.

As shown in FIG. 2B, the extended application 204 is capable of exchanging information with the rendering application 201, the print data generation software 202, and the printing device 102, respectively, that is, the extended application 204 is capable of transmitting and receiving information to and from the rendering application 201, the print data generation software 202, and the printing device 102, respectively. That is, the extended application 204 has been associated with the rendering application 201, the print data generation software 202, and the printing device 102. In the present embodiment, the extended application 204 includes a print setting screen extending unit 205, a skip control unit 206, a print function extending unit 207, a print data editing unit 208, and a notifying unit 209. In addition, the extended application 204 includes shared information 210 that can be accessed from each unit of the print setting screen extending unit 205, the skip control unit 206, the print function extending unit 207, the print data editing unit 208, and the notifying unit 209. The shared information 210 is a file stored in the external storage device 114 or information stored in the RAM 113. The extended application 204 is able to perform writing and reading of the shared information 210 by using an application program interface (an API) provided by the OS.

In addition, the extended application 204 includes information regarding a sheet size threshold value Ts. The sheet size threshold value Ts is a length used to determine whether or not a pixel number limit function, which will be described below, is added as a print function of the printing device 102. The extended application 204 includes a rendering application pixel number threshold value table 901 (see FIG. 9). In the rendering application pixel number threshold value table 901, a plurality of pixel number threshold values Tp are prepared (stored) as pixel number threshold values. In addition, each pixel number threshold value Tp differs depending on the type of the rendering application 201. This is because the number of pixels (the pixel number) in a rendering area in which the rendering errors may occur (are likely to occur) differs depending on the rendering application 201. It should be noted that the extended application 204 may end the operation of the extended application 204 as a whole when the processing of each unit of the print setting screen extending unit 205, the skip control unit 206, the print function extending unit 207, the print data editing unit 208, and the notifying unit 209 ends. In this case, the OS activates the extended application 204 every time it receives a processing execution request from each unit of the print setting screen extending unit 205, the skip control unit 206, the print function extending unit 207, the print data editing unit 208, and the notifying unit 209. Furthermore, the OS causes to end the operation of the extended application 204 as a whole in the case that for example, the processing of the print setting screen extending unit 205 ends, but may leave the extended application 204 as a whole running as is in the case that the processing of the skip control unit 206 ends. Furthermore, the extended application 204 may cancel the processing of each unit of the print setting screen extending unit 205, the skip control unit 206, the print function extending unit 207, the print data editing unit 208, and the notifying unit 209 during the processing of each unit of the print setting screen extending unit 205, the skip control unit 206, the print function extending unit 207, the print data editing unit 208, and the notifying unit 209. In this case, a job being processed on a print queue is deleted by the OS.

As described above, the rendering application 201 issues a printing instruction to the OS upon receiving a printing request from the user. In addition, the rendering application 201 is able to cause to display a print setting screen. In the configuration shown in FIG. 2B, the rendering application 201 is able to cause to display a print setting screen provided by the print setting screen extending unit 205 (the extended application 204). It should be noted that whether or not to permit display of the print setting screen provided by the print setting screen extending unit 205 can also be made dependent on the user's operation.

In addition, in the case that the rendering application 201 receives the printing request from the user and the printing instruction has been issued to the OS, the OS activates the skip control unit 206. The skip control unit 206 controls whether or not to skip (omit) a conversion processing performed by the print data generation software 202. It should be noted that the skip control unit 206 cannot obtain the intermediate data and the print setting information. In the case that the skip control processing is not executed, the intermediate data from the rendering application 201 is conversion-processed by the print data generation software 202 into the print data that can be processed by the printing device 102, that is, the print data that can be printed by the printing device 102. Then, this print data is transmitted to the print data editing unit 208. In the case that the skip control processing has been executed, the intermediate data from the rendering application 201 is not conversion-processed by the print data generation software 202 and is transmitted to the print data editing unit 208. In this case, the intermediate data is conversion-processed by the print data editing unit 208 into data that can be printed by the printing device 102. The case where it is preferable to skip the conversion processing performed by the print data generation software 202 is not particularly limited, and includes, for example, a case where it is desired to perform an enlargement/reduction processing by the print data editing unit 208. The intermediate data can be held in a vector format, and image deterioration during enlarging/reducing can be prevented or suppressed. Therefore, in the configuration in which the print data generation software 202 outputs images in a raster format, it is preferable that the conversion processing performed by the print data generation software 202 is skipped and the intermediate data is conversion-processed by the print data editing unit 208.

The print data editing unit 208 performs editing of the intermediate data transmitted from the print data generation software 202 or the print data conversion-processed by the print data generation software 202. After being edited by the print data editing unit 208, the print data is transmitted to the printing device 102 via the OS. The printing device 102 performs printing on the print medium based on this print data. It should be noted that in the case that the conversion processing performed by the print data generation software 202 has been skipped, the print data editing unit 208 converts the intermediate data into the print data that can be processed by the printing device 102 and transmits it to the printing device 102.

The print function extending unit 207 is able to edit the print function information 203 (the PDC) generated by the print data generation software 202 or the OS. As a result, although the addition of functions provided by the extended application 204 can be executed by the printing device 102, it is possible to perform the addition of functions that cannot be executed by the print data generation software 202, the addition of the exclusive relationships between the setting values of the print functions, and the like. The OS activates the print function extending unit 207 when the extended application 204 has been first associated with the printing device 102 and the print data generation software 202. Furthermore, the OS may activate the print function extending unit 207 at other timings (for example, when the OS is activated). With such activation, even in the case that a printing-related function is extended later, the print function extending unit 207 is able to detect the extended printing-related function and add it to the print function information 203. An example of the case that the printing-related function is extended later is a case of adding an optional device (for example, a two-stage roll unit, a finisher, or the like) to the printing device 102 later.

The notifying unit 209 is able to, when an error occurs in the printing device 102, notify that the error occurs in the printing device 102. For example, in the case that a sheet out error occurs in the printing device 102, the print data generation software 202 detects the occurrence of this sheet out error. By using a notifying function called a toast notification, which is one of the functions of the OS, the OS causes the display unit 119 to display the occurrence of the sheet out error, which is a detection result obtained by the print data generation software 202, as a message. It should be noted that when the user operates the toast notification, the notifying unit 209 is called out by the OS, and a user interface screen of the notifying unit 209 is displayed. On the user interface screen, for example, a detailed message regarding the sheet out error, a sheet filling method, etc. can be displayed.

As described above, in the present embodiment, it can be said that the extended application 204 includes the following five functions. The first function is a function to display a setting screen. The first function is executed by the print setting screen extending unit 205. The second function is a function to control whether or not to skip the conversion processing performed by the print. data generation software 202. The second function is executed by the skip control unit 206. The third function is a function to edit the print data inputted into the printing device 102. The third function is executed by the print data editing unit 208. The fourth function is a function to extend the functions that can be designated by the print data generation software 202. The fourth function is executed by the print function extending unit 207. The fifth function is a function to display the error that has occurred in the printing device 102. The fifth function is executed by the notifying unit 209.

Next, the format of the data handled in the printing system will be described. The print data generation software 202 obtains the capability information from the printing device 102. Based on the obtained capability information, the print data generation software 202 determines the format of the print data that can be supported by the printing device 102, that is, determines the format of the print data that can be processed by the printing device 102. As a result, the print data generation software 202 is able to generate the print data that can be processed by the printing device 102. It should be noted that hereinafter, the term "the format of the print data" actually refers to the format of the rendering data included in the print data.

Figure 3A:
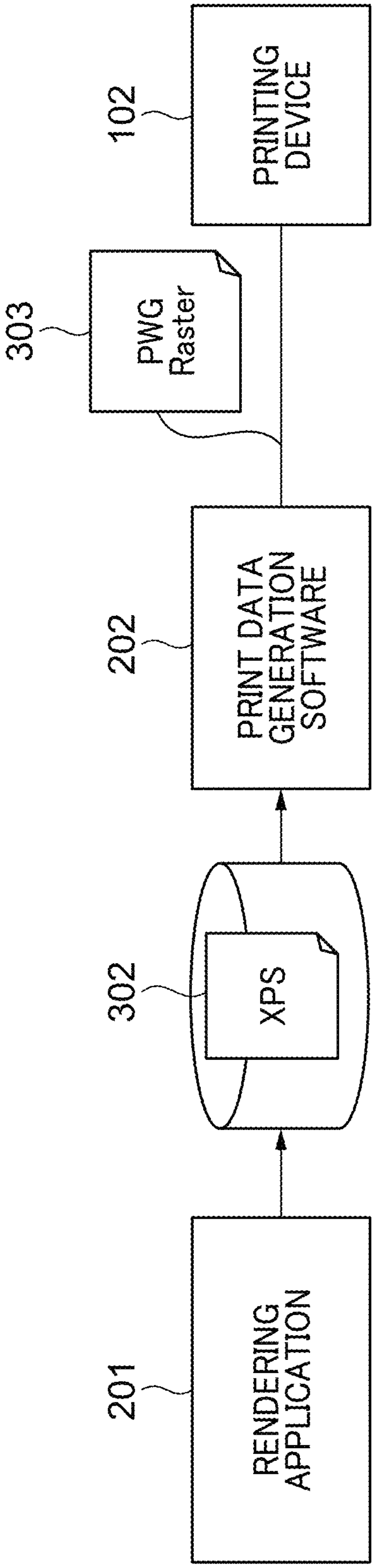
FIG. 3A, FIG. 3B, and FIG. 3C are diagrams that show formats of data handled by each software of the printing system shown in FIG. 1.
Figure 3B:
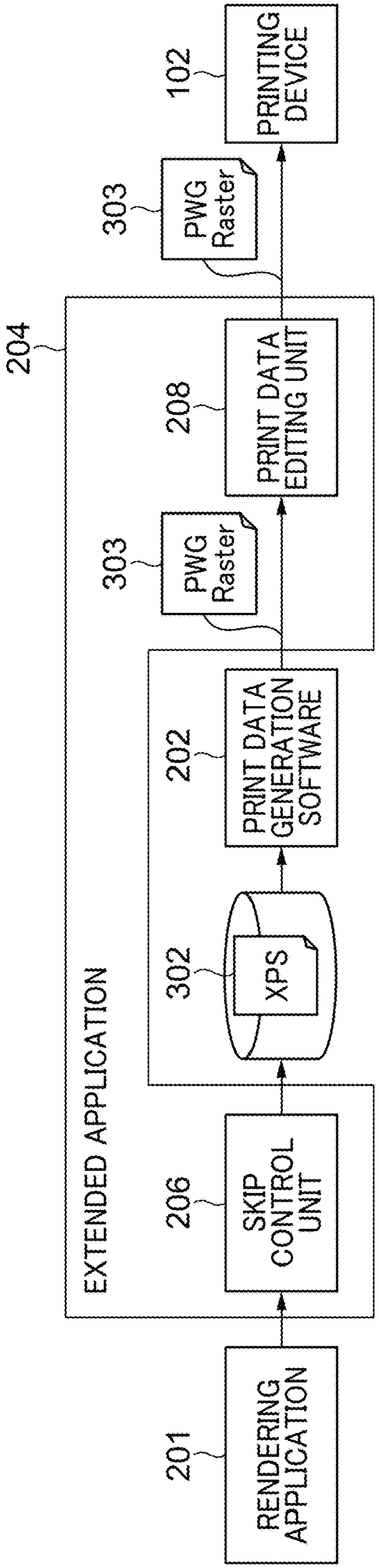
Figure 3C:
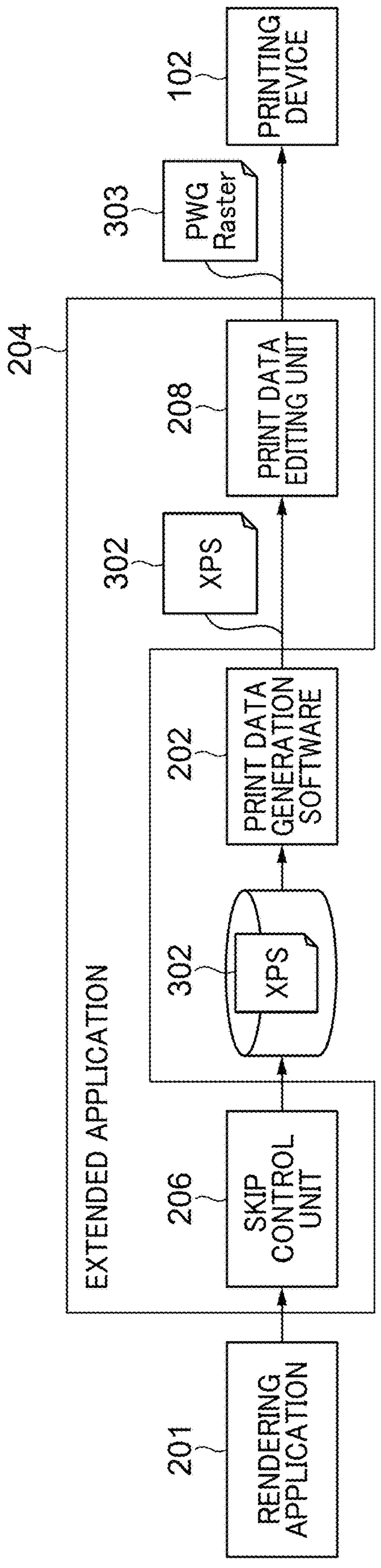

FIG. 3A, FIG. 3B, and FIG. 3C are diagrams that show the formats of the data handled by each software of the printing system. FIG. 3A is a diagram corresponding to FIG. 2A. FIG. 3A is the diagram that shows the formats of the data handled by each software of the printing system in the case that the extended application 204 has not been associated with the print data generation software 202 and the printing device 102. As shown in FIG. 3A, when the OS receives the printing instruction from the rendering application 201, the OS generates XPS data 302 that is the intermediate data. As described above, the rendering application 201 is the software that creates the print data to be printed by the printing device 102. In addition, the XPS data 302 becomes data (secondary data), a volume of which is smaller than a volume of the print data (primary data) from the rendering application 201, generated by lowering a resolution of the print data (the primary data) from the rendering application 201. Next, the print data generation software 202 converts the XPS data 302 into the print data that can be processed by the printing device 102 (a converting step). At this time, the print data generation software 202 determines the format of the print data that can be processed based on the capability information (the attribute data) obtained from the printing device 102. Then, the print data generation software 202 generates the print data that can be processed by the printing device 102 according to this format. Although the format of the print data is PWG Raster in the present embodiment, the format of the print data is not limited to PWG Raster, and may be, for example, PDF or the like. The print data generation software 202 converts the XPS data 302 into PWG Raster data 303 and transmits it to the printing device 102. As a result, the printing device 102 receives the PWG Raster data 303 and performs printing based on the PWG Raster data 303.

FIG. 3B is a diagram corresponding to FIG. 2B. FIG. 3B is the diagram that shows the formats of the data handled by each software of the printing system in the case that the extended application 204 has been associated and a skip instruction to skip the conversion processing (a print data generation processing) performed by the print data generation software 202 has not been issued. As shown in FIG. 3B, when the OS receives the printing instruction from the rendering application 201, the OS generates XPS data 302 that is the intermediate data, and calls out the skip control unit 206 of the extended application 204. It should be noted that in FIG. 3B, the skip control unit 206 does not execute the instruction to skip the conversion processing performed by the print data generation software 202. As a result, similar to FIG. 3A, the print data generation software 202 converts the XPS data 302 into PWG Raster data 303. Next, the print data editing unit 208 receives the PWG Raster data 303 as the input data. The PWG Raster data 303 is the print data that can be processed by the printing device 102. The print data editing unit 208 transmits the PWG Raster data 303 as is to the printing device 102. As a result, the printing device 102 receives the PWG Raster data 303 and performs printing based on the PWG Raster data 303.

FIG. 3C is a diagram corresponding to FIG. 2C. FIG. 3C is the diagram that shows the formats of the data handled by each software of the printing system in the case that the extended application 204 has been associated and a skip instruction to skip the conversion processing (the print data generation processing) performed by the print data generation software 202 has been issued. As shown in FIG. 3C, when the OS receives the printing instruction from the rendering application 201, the OS (a generating unit) generates XPS data 302 that is the intermediate data (a generating step). It should be noted that it is preferable that the pixel number of the XPS data is less than a pixel number threshold value Tp, which will be described below. In addition, the OS calls out the skip control unit 206 of the extended application 204. Next, the skip control unit 206 issues an instruction not to execute the conversion processing from the XPS data 302 (the intermediate data) into the print data, that is, the instruction to skip the conversion processing to the print data generation software 202 (or the OS) (an omitting step). When the print data generation software 202 receives this skip instruction, the print data generation software 202 transmits the XPS data 302 as is to the print data editing unit 208 of the extended application 204 without converting the XPS data 302 into the print data. Next, the print data editing unit 208 performs necessary editing with respect to the XPS data 302, for which the conversion processing performed by the print data generation software 202 has been omitted, based on the print setting information, and then converts it into PWG Raster data 303 (a converting step). Then, the print data editing unit 208 transmits the PWG Raster data 303 to the printing device 102 (a transmitting step). As a result, the printing device 102 receives the PWG Raster data 303 and performs printing based on the PWG Raster data 303. It should be noted that in the case that the format of the print data that can be processed by the printing device 102 includes the XPS data, the print data editing unit 208 can also transmit the XPS data to the printing device 102 without converting it into another format.

Figure 4:
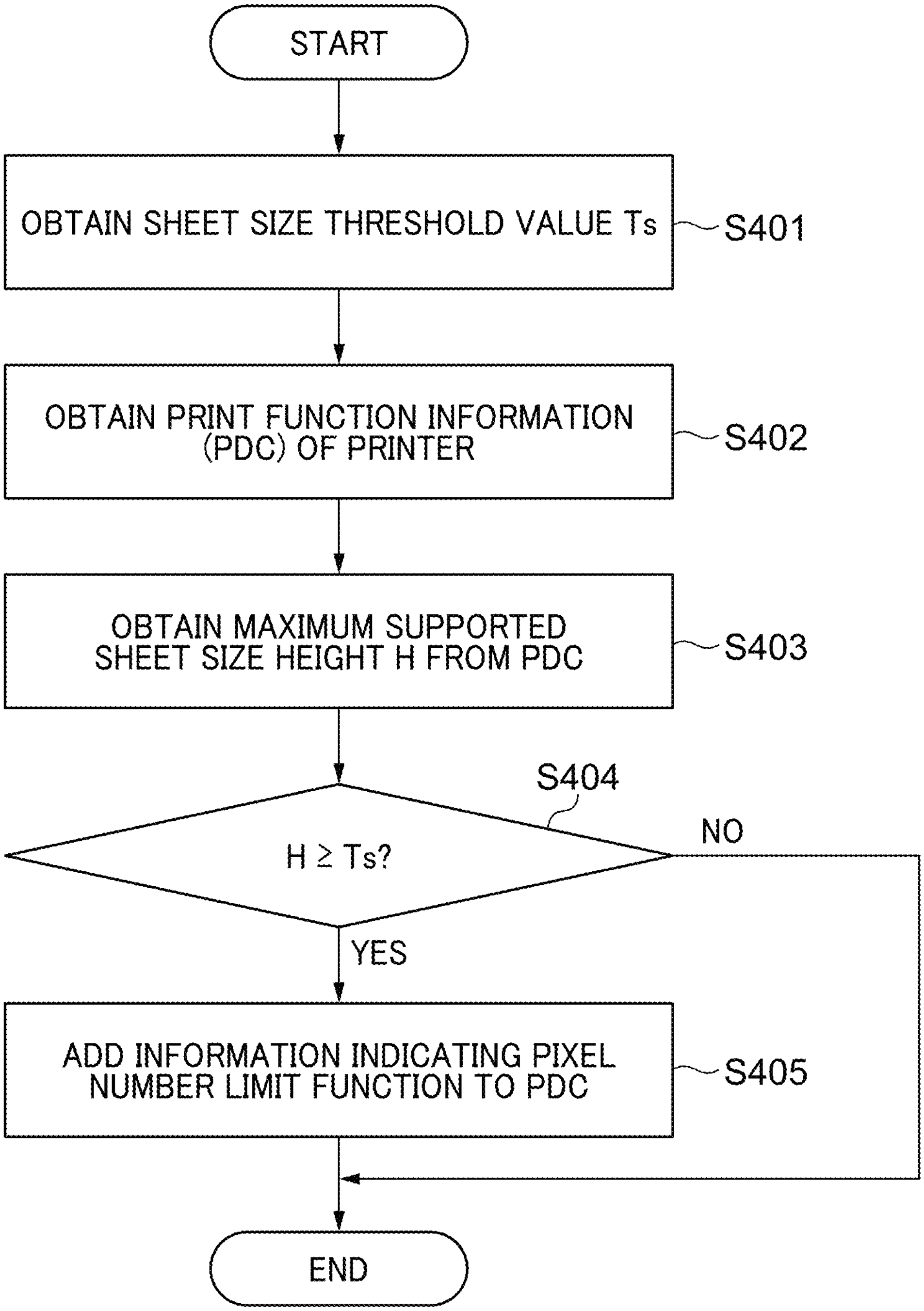
FIG. 4 is a flowchart that shows the main processing of a print function information editing processing performed by a print function extending unit of the printing system shown in FIG. 1.

Next, a print function information editing processing performed by the print function extending unit will be described. Here, a processing that adds the pixel number limit function to the print function information will be described. "The pixel number limit function" refers to a function that suppresses the occurrence of the printing errors (the rendering errors) such as missing of rendering objects by setting an upper limit on the pixel number of the intermediate data generated by the rendering application 201. Furthermore, "missing of the rendering objects" refers to an error in which, for example, depending on the sheet size, the rendering objects (rendering target objects such as characters, lines, figures, and images) that should exist in the intermediate data are missing. FIG. 4 is a flowchart that shows the main processing of the print function information editing processing performed by the print function extending unit of the printing system. FIG. 5 is a diagram that shows an example of the PDC. FIG. 6 is a diagram that shows an example of the PDC to which information indicating the pixel number limit function is added. A program based on the flowchart shown in FIG. 4 is executed by the CPU 111. In addition, the program based on the flowchart shown in FIG. 4 is started by activating the print function extending unit 207, for example, at the timing when the extended application 204 has been associated for the first time. As shown in FIG. 4, in a step S401, the print function extending unit 207 (an obtaining unit) obtains information on the sheet size threshold value Ts possessed by the extended application 204, and the processing proceeds to a step S402. The printing errors such as missing of the rendering objects, which have been described above, are noticeable in large-sized printers or the like compatible with sheet sizes of A3 size or larger. The sheet size threshold value Ts can be set to, for example, any value for each printing device 102, but in consideration of the printing errors, it is preferable to use, for example, the length of an A3 size sheet "420.0 mm".

In the step S402, the print function extending unit 207 obtains PDC 501 (see FIG. 5) as the print function information 203 from the print data generation software 202, and the processing proceeds to a step S403. The PDC 501 shown in FIG. 5 includes information on functions (Features) supported by the printing device 102, information on setting values (Options) for predetermined functions, and the like. In the present embodiment, the PDC 501 includes information 502, information 503, and information 504. The information 502 indicates that ISOA4 and Poster 44×64 are settable as PageMediaSize (the sheet size). The information 503 indicates that Plain (plain paper) and Photographic (photographic paper) are settable as PageMediaType (the sheet type). The information 504 indicates that Portrait (portrait) and Landscape (landscape) are settable as PageOrientation (an orientation of print). It should be noted that the PDC 501 does not include information indicating that the pixel number limit function is settable.

In the step S403, the print function extending unit 207 obtains the length (the size) along a long side direction of the largest sheet supported by the printing device 102 (an obtaining step), and the processing proceeds to a step S404. In the present embodiment, the print function extending unit 207 refers to the information 502 of the PDC 501 obtained in the step S402, and obtains the largest value among values of MediaSizeHeight as the maximum sheet size height H supported by the printing device 102 (the height H of the size of the largest sheet supported by the printing device 102). It should be noted that although the height (a total length) of the sheet is used as an index indicating the size of the sheet (the sheet size) in the embodiment, the present invention is not limited to this, and for example, the width of the sheet or the like may also be used as the index indicating the size of the sheet (the sheet size).

In the step S404, the print function extending unit 207 compares the sheet size threshold value Ts obtained in the step S401 with the maximum sheet size height H obtained in the step S403, and determines whether or not $H \geq Ts$ holds (a determining step). As a result of the determination performed in the step S404, in the case of being determined that $H \geq Ts$ holds, the processing proceeds to a step S405. On the other hand, as the result of the determination performed in the step S404, in the case of being determined that $H \geq Ts$ does not hold, that is, $H < Ts$ holds, the processing ends.

In the step S405, the print function extending unit 207 adds the information indicating the pixel number limit function to the PDC 501. As shown in FIG. 6, information 602 has been added to PDC 601. The information 602 is the information indicating the pixel number limit function added by the process of the step S405. The information 602 indicates that Auto, ON, and OFF are settable as JobPixelNumberLimitation. It should be noted that "Auto (see FIG. 7B)" is a setting in which the upper limit of the pixel number of the intermediate data is set to a different value depending on the name of the rendering application 201, or there is no upper limit of the pixel number of the intermediate data depending on the name of the rendering application 201. "ON (see FIG. 7B)" is a setting in which the upper limit of the pixel number of the intermediate data is set to the same value regardless of the name of the rendering application 201. "OFF (see FIG. 7B)" is a setting in which there is no upper limit of the pixel number of the intermediate data.

Figure 7A:
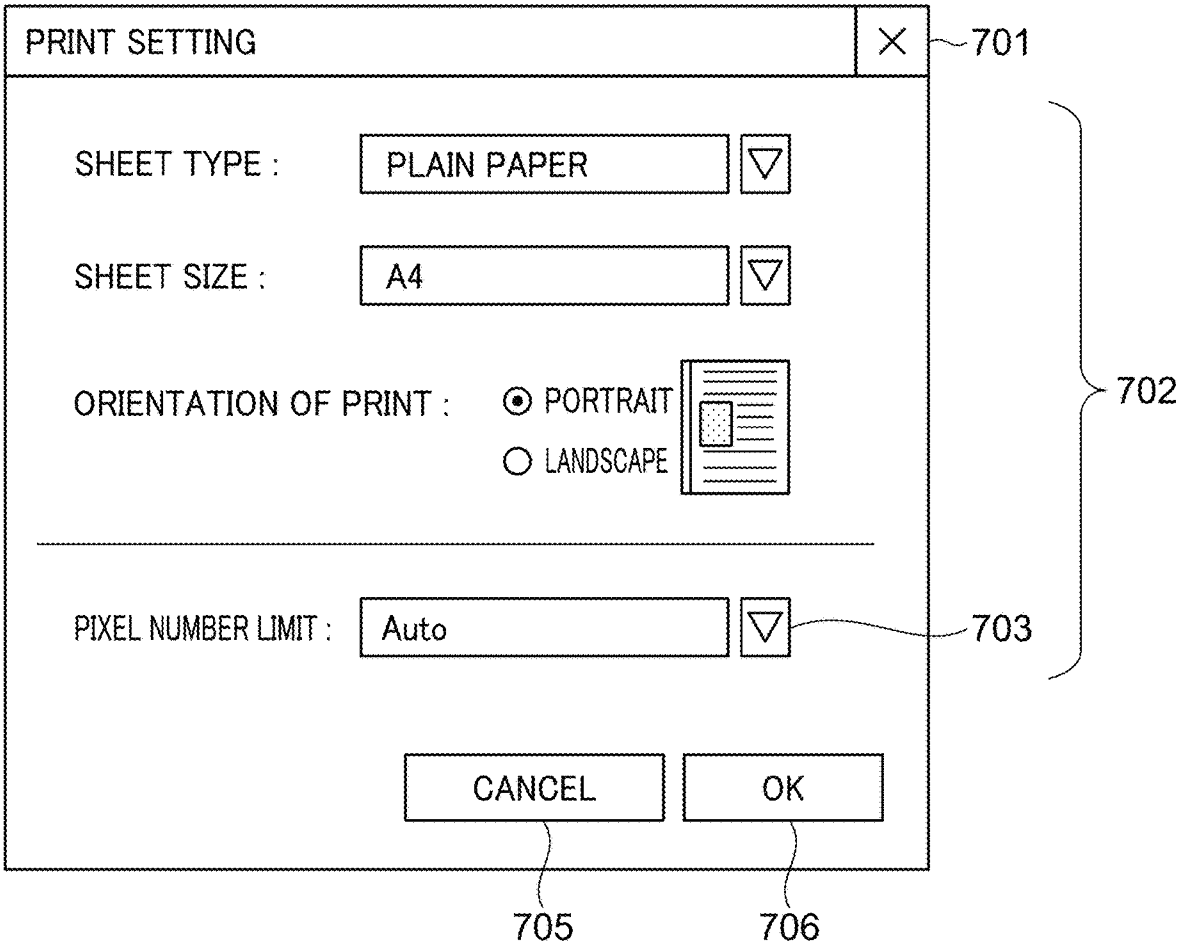
FIG. 7A and FIG. 7B are diagrams that show a print setting screen provided by a print setting screen extending unit of the printing system shown in FIG. 1.
Figure 7B:
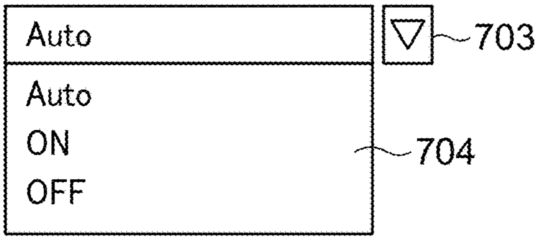

Next, the print setting screen provided by the print setting screen extending unit will be described. FIG. 7A and FIG. 7B are diagrams that show the print setting screen provided by the print setting screen extending unit. FIG. 7A is the diagram that shows an example of the print setting screen provided by the print setting screen extending unit. A print setting screen 701 shown in FIG. 7A is a screen on which print functions in the print data generation software 202 can be designated by the PC generated based on the PDC described above. The print setting screen 701 includes control items 702, a cancel button 705, and an OK button 706. With the control items 702, it is possible to perform setting and changing of respective print functions such as the sheet type, the sheet size, and the orientation of print. In the case that the cancel button 705 has been pressed, the setting values changed by using the control items 702 are not reflected in the print setting. On the other hand, in the case that the OK button 706 has been pressed, the setting values changed by using the control items 702 are reflected in the print setting.

The control items 702 include a pixel number limit function control item 703. With the pixel number limit function control item 703, it is possible to set the pixel number limit function that has been added to the PDC 601 in the step S405 of the flowchart shown in FIG. 4. FIG. 7B is the diagram that shows an example of the pixel number limit function control item and a pixel number limit function drop-down list for causing to select a setting value of the pixel number limit function. By operating the pixel number limit function control item 703, a pixel number limit function drop-down list 704 is displayed. The pixel number limit function drop-down list 704 displays setting values based on the information 602, that is, "Auto", "ON", and "OFF" (a displaying step). Thereby, the user is able to select a desired setting value and switch whether or not to enable the pixel number limit function (switch whether or not to enable the execution of the determination in the determining step). In this way, the pixel number limit function drop-down list 704 serves as a switching screen for switching between enabling and disabling the pixel number limit function. It should be noted that it is preferable that a specified value (a default value) of the setting value is "Auto". As described above, "Auto" allows the upper limit of the pixel number of the intermediate data to be set to a different value depending on the name of the rendering application 201. Therefore, by setting "Auto" to the specified value of the setting value, it is possible to perform a suitable processing according to the rendering ability of the rendering application 201.

Figure 8:
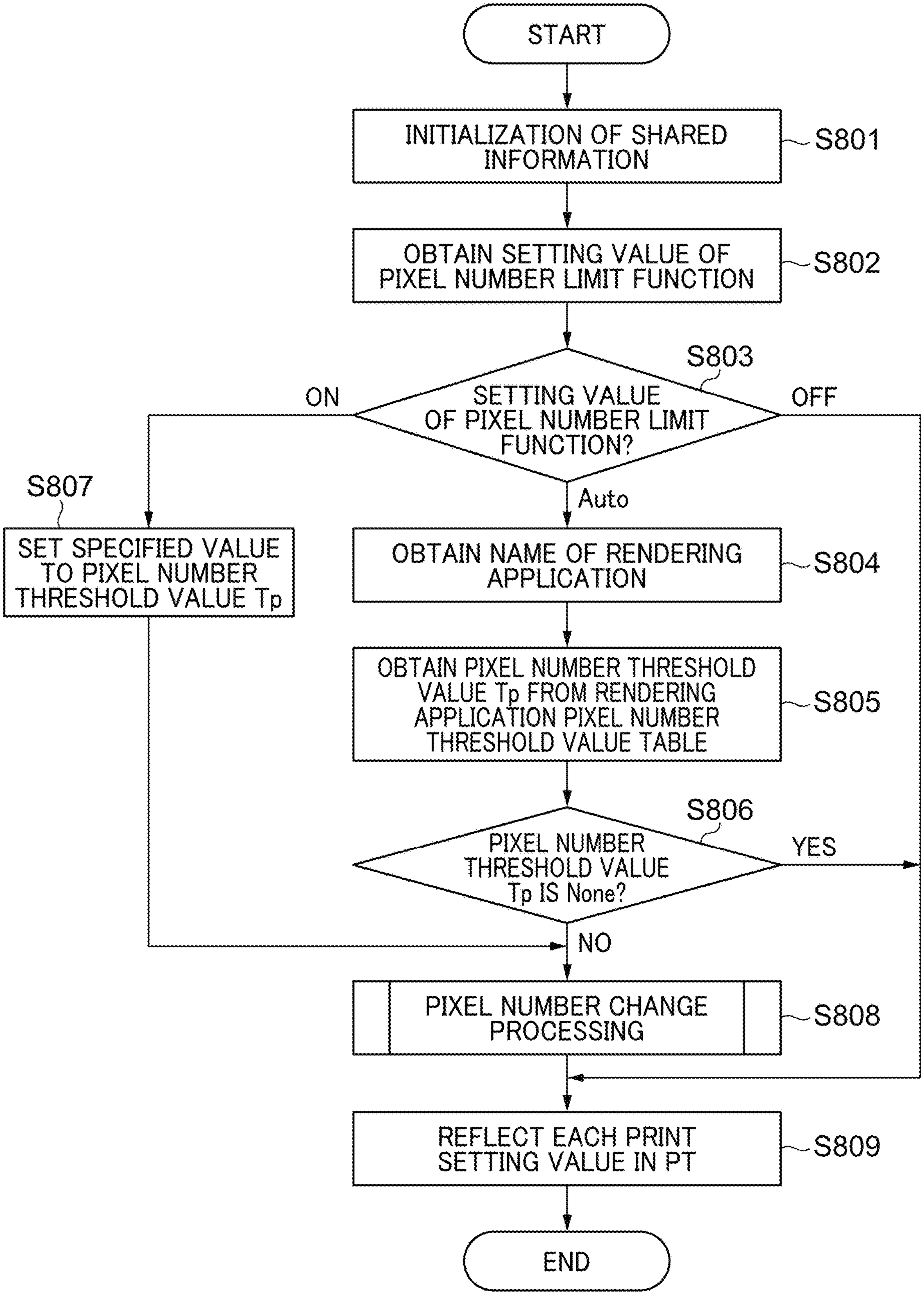
FIG. 8 is a flowchart that shows an example of a print setting screen display processing performed by the print setting screen extending unit of the printing system shown in FIG. 1.

Next, a print setting screen display processing performed by the print setting screen extending unit will be described. FIG. 8 is a flowchart that shows an example of the print setting screen display processing performed by the print setting screen extending unit. FIG. 9 is a diagram that shows an example of a pixel number threshold value table of the rendering application (the rendering application pixel number threshold value table). A program based on the flowchart shown in FIG. 8 is executed by the CPU 111. In addition, the program based on the flowchart shown in FIG. 8 is started, for example, when the OK button 706 on the print setting screen 701 has been pressed. As shown in FIG. 8, in a step S801, the print setting screen extending unit 205 performs the initialization of the shared information 210, and the processing proceeds to a step S802. Specifically, the print setting screen extending unit 205 performs the deletion of information that has already been stored in the shared information 210.

In the step S802, the print setting screen extending unit 205 obtains the setting value of the pixel number limit function set on the pixel number limit function control item 703, and the processing proceeds to a step S803.

In the step S803, the print setting screen extending unit 205 determines the setting value of the pixel number limit function obtained in the step S802. As a result of the determination performed in the step S803, in the case of being determined that the setting value of the pixel number limit function is Auto, the processing proceeds to a step S804. In addition, as the result of the determination performed in the step S803, in the case of being determined that the setting value of the pixel number limit function is ON, the processing proceeds to a step S807. In addition, as the result of the determination performed in the step S803, in the case of being determined that the setting value of the pixel number limit function is OFF, the processing proceeds to a step S809.

In the step S804, the print setting screen extending unit 205 obtains the name of the rendering application 201, and the processing proceeds to a step S805.

In the step S805, the print setting screen extending unit 205 obtains (selects) the pixel number threshold value Tp corresponding to the name of the rendering application 201, which is obtained in the step S804, from the rendering application pixel number threshold value table 901 (see FIG. 9). The rendering application pixel number threshold value table 901 shown in FIG. 9 is a table that shows a relationship between the names of a plurality of rendering applications 201 and the pixel number threshold values Tp corresponding to the respective rendering applications 201. For example, in the case that the name of the rendering application 201 is "Architecture 3D", the pixel number threshold value Tp is 100000 (dots). The rendering application pixel number threshold value table 901 is held in advance in the extended application 204. In the case that the rendering application 201 performs rendering with respect to a rendering area with a relatively large number of pixels, the rendering errors (the printing errors) such as missing of the rendering objects may occur. Depending on the rendering ability of the rendering application 201, the threshold value of the pixel number in the rendering area in which such rendering errors may occur (are likely to occur) differs. Therefore, in the rendering application pixel number threshold value table 901, for each rendering application 201, the threshold value of the pixel number that can sufficiently suppress the occurrence of the rendering errors is defined in advance as the pixel number threshold value Tp. It should be noted that the pixel number threshold value Tp can be set arbitrarily, but is preferably set to, for example, an experimental value based on the number of pixels (the pixel number) at which the rendering errors such as missing of the rendering objects actually occur in the rendering application 201. In addition, in the rendering application 201 for which the pixel number threshold value Tp is not set, a value of "None" is defined (see the name of the rendering application 201 "Fine CAD Creator" and the pixel number threshold value Tp "None" that are shown in FIG. 9). It should be noted that, in the rendering application 201 for which the pixel number threshold value Tp is not set, for example, "0", "a negative value" or the like may be defined as the pixel number threshold value Tp. In this case, if the pixel number threshold value Tp is "0" or "a negative value", the rendering application 201 may be configured to be determined to be the rendering application 201 for which the pixel number threshold value Tp is not set. After executing the step S805, the processing proceeds to a step S806.

In the step S806, the print setting screen extending unit 205 determines whether or not the pixel number threshold value Tp is None. As a result of the determination performed in the step S806, in the case of being determined that the pixel number threshold value Tp is None, it is assumed that printing has been executed by the rendering application 201 for which the pixel number threshold value Tp is not set, the processing proceeds to the step S809. On the other hand, as the result of the determination performed in the step S806, in the case of being determined that the pixel number threshold value Tp is not None, the processing proceeds to a step S808.

In the step S807 after executing the step S803, the print setting screen extending unit 205 sets the pixel number threshold value Tp to a specified value, and the processing proceeds to the step S808. This specified value is a value that is held in advance in the print setting screen extending unit 205 or the extended application 204 and can be arbitrarily set by a designer, and is set to, for example, "24000" in the present embodiment. In addition, it is preferable that the specified value is maintained (held) at a value equal to or less than the minimum value among the pixel number threshold values Tp defined in the rendering application pixel number threshold value table 901. In the case that the rendering errors occur when printing has been executed while the setting value of the pixel number limit function is "Auto", such a setting value contributes to suppressing the occurrence of the rendering errors as much as possible by changing the setting value of the pixel number limit function to "ON" and then executing printing. Furthermore, the setting value is not limited to a constant, and for example, may be a variable determined with reference to conditions that may affect the rendering result of the rendering application 201, such as the capacity of the RAM 113 of the host computer 101, the version of the OS, or the like.

In the step S808, the print setting screen extending unit 205 performs a pixel number change processing, and the processing proceeds to the step S809. Details of the pixel number change processing will be described below with reference to FIG. 10.

In the step S809, the print setting screen extending unit 205 reflects the changed print setting in the PT (the print setting information), and the processing ends.

Figure 10:
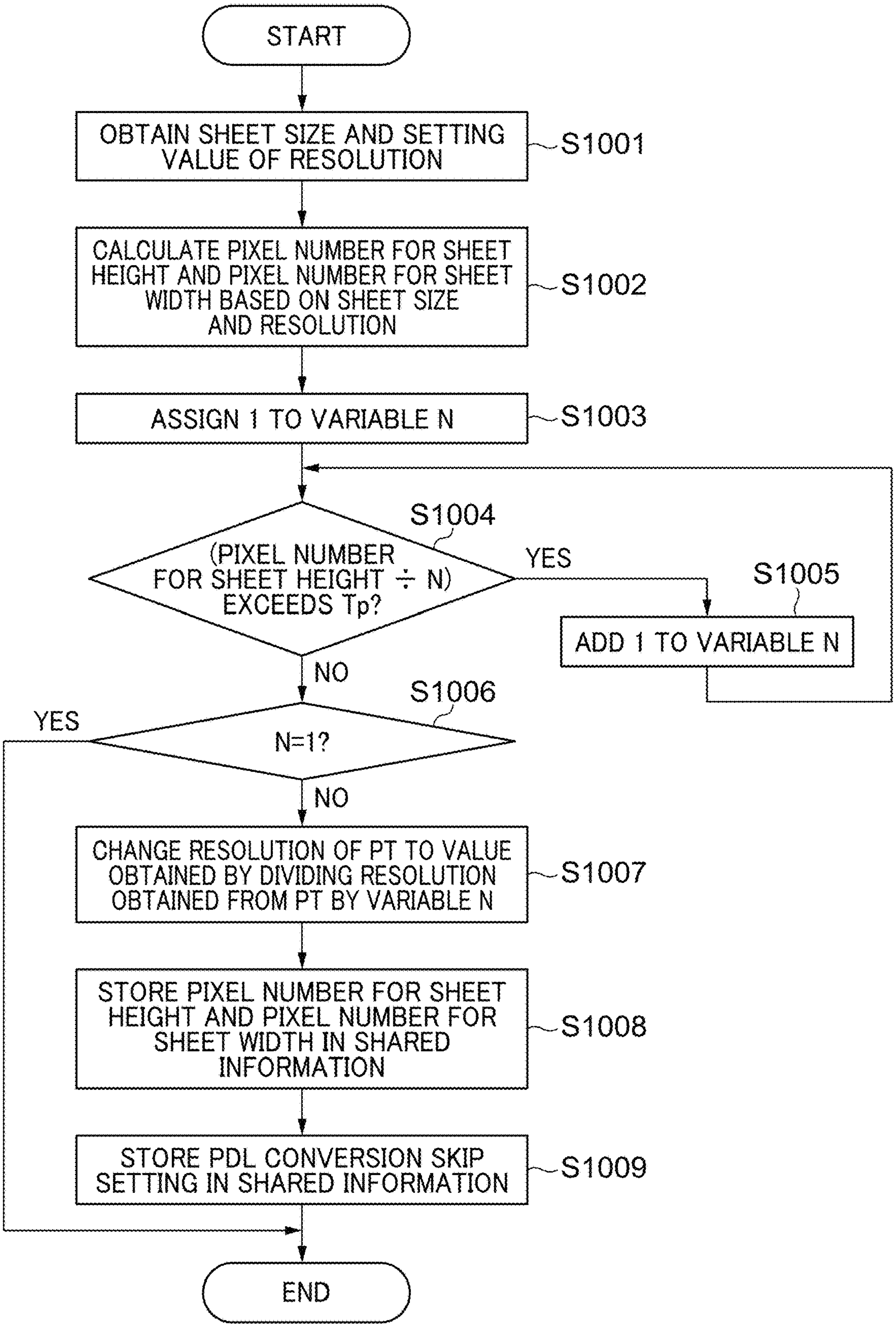
FIG. 10 is a flowchart that shows a processing performed in a step S808 (a subroutine) of the flowchart shown in FIG. 8.

FIG. 10 is a flowchart that shows the pixel number change processing performed in the step S808 (a subroutine) of the flowchart shown in FIG. 8. As shown in FIG. 10, in a step S1001, the print setting screen extending unit 205 obtains the sheet size, and setting values of a vertical resolution (dpi) and a horizontal resolution (dpi) for the sheet from the PT, and the processing proceeds to a step S1002. It is assumed that the sheet size includes the height of the sheet and the width of the sheet.

In the step S1002, the print setting screen extending unit 205 calculates a pixel number in the height of the sheet (a pixel number for the sheet height) and a pixel number in the width of the sheet (a pixel number for the sheet width) based on the sheet size and the setting values of the vertical resolution and the horizontal resolution that are obtained in the step S1001, and the processing proceeds to a step S1003. The pixel number in the height of the sheet is calculated by using the following Equation (1). The pixel number in the width of the sheet is calculated by using the following Equation (2). It should be noted that in the present embodiment, it is assumed that a calculation result of the following Equation (1) and a calculation result of the following Equation (2) are both rounded down to the decimal point.

Equation (1)

$$\text{the pixel number in the height of the sheet (dots)} = \text{the height of the sheet (mm)} \times \text{the vertical resolution (dpi)} \div 25.4 \tag{1}$$

Equation (2)

$$\text{the pixel number in the width of the sheet (dots)} = \text{the width of the sheet (mm)} \times \text{the horizontal resolution (dpi)} \div 25.4 \tag{2}$$

In the step S1003, the print setting screen extending unit 205 assigns 1 to a variable N, and the processing proceeds to a step S1004. The variable N is a variable used in the processing of the flowchart shown in FIG. 10, and is stored in the RAM 113.

In the step S1004, the print setting screen extending unit 205 determines whether or not "(the pixel number in the height of the sheet÷N)>Tp" holds. As a result of the determination performed in the step S1004, in the case of being determined that "(the pixel number in the height of the sheet÷N)>Tp" holds, the processing proceeds to a step S1005. On the other hand, as the result of the determination performed in the step S1004, in the case of being determined that "(the pixel number in the height of the sheet÷N)>Tp" does not hold, the processing proceeds to a step S1006. In the present embodiment, the pixel number in the height of the sheet is used for the determination in the step S1004, but the present invention is not limited to this, and the pixel number in the width of the sheet, or a product of the pixel number in the height of the sheet and the pixel number in the width of the sheet may be used for the determination in the step S1004. In addition, it is also possible to use the height of a printable area excluding margins at the edges of the sheet, the width of the printable area, or a product of the height of the printable area and the width of the printable area for the determination in the step S1004. It should be noted that in these cases, it is necessary to define a pixel number threshold value Tp corresponding to each of these cases.

In the step S1005, the print setting screen extending unit 205 adds 1 to the variable N, the processing returns to the step S1004, and the subsequent steps are sequentially executed.

In the step S1006, the print setting screen extending unit 205 determines whether or not the variable N is 1. As a result of the determination performed in the step S1006, in the case of being determined that the variable N is 1, the processing ends. On the other hand, as the result of the determination performed in the step S1006, in the case of being determined that the variable N is not 1, the processing proceeds to a step S1007.

In the step S1007, the print setting screen extending unit 205 calculates values obtained by dividing the vertical resolution and the horizontal resolution, which are obtained from the PT in the step S1001, by the variable N, respectively. Then, the print setting screen extending unit 205 changes the vertical resolution of the PT to the value obtained by dividing the vertical resolution obtained from the PT by the variable N and changes the horizontal resolution of the PT to the value obtained by dividing the horizontal resolution obtained from the PT by the variable N, and the processing proceeds to a step S1008. It should be noted that the values of the vertical resolution of the PT, the horizontal resolution of the PT, and the pixel number in the height of the sheet and the pixel number in the width of the sheet that are calculated based on the vertical resolution of the PT and the horizontal resolution of the PT are notified to the rendering application 201 as rendering ability information via the print data generation software 202 (or the OS). In response to receiving the printing instruction, the rendering application 201 executes rendering with respect to a rendering area whose size corresponds to the rendering ability information when generating the intermediate data.

In the step S1008, the print setting screen extending unit 205 stores the pixel number in the height of the sheet and the pixel number in the width of the sheet, which are calculated in the step S1002, in the shared information 210, and the processing proceeds to a step S1009.

In the step S1009, the print setting screen extending unit 205 stores a PDL conversion skip setting in the shared information 210, and the processing ends. This PDL conversion skip setting is used in a determination whether or not to issue a PDL conversion skip instruction, which is performed by the skip control unit 206 and will be described below.

Figure 11:
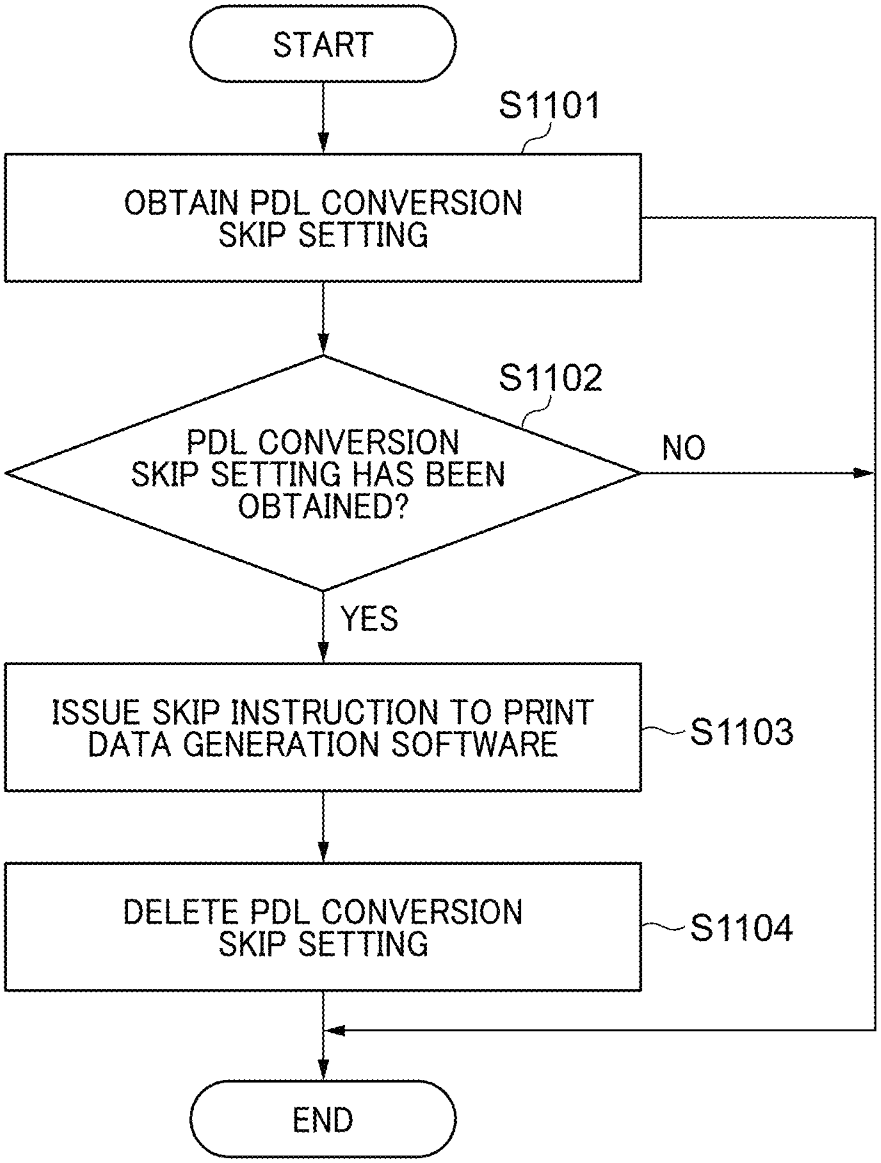
FIG. 11 is a flowchart that shows an example of a skip processing performed by a skip control unit of the printing system shown in FIG. 1.

FIG. 11 is a flowchart that shows an example of a skip processing performed by the skip control unit. A program based on the flowchart shown in FIG. 11 is executed by the CPU 111. In addition, the program based on the flowchart shown in FIG. 11 is started, for example, when the printing instruction has been issued from the rendering application 201 and the skip control unit 206 is activated by the OS in response to the issuance of the printing instruction. As shown in FIG. 11, in a step S1101, the skip control unit 206 obtains the PDL conversion skip setting from the shared information 210, and the processing proceeds to a step S1102.

In the step S1102, the skip control unit 206 determines whether or not the PDL conversion skip setting has been obtained in the step S1101. As a result of the determination performed in the step S1102, in the case of being determined that the PDL conversion skip setting has been obtained in the step S1101, the processing proceeds to a step S1103. On the other hand, as the result of the determination performed in the step S1102, in the case of being determined that the PDL conversion skip setting has not been obtained in the step S1101, the processing ends.

In the step S1103, the skip control unit 206 issues the skip instruction to the print data generation software 202 (or the OS), and the processing proceeds to a step S1104. "The skip instruction" is an instruction to omit the step of converting the intermediate data into the print data that can be processed by the printing device 102 by using the print data generation software 202.

In the step S1104, the skip control unit 206 deletes the PDL conversion skip setting stored in the shared information 210, and the processing ends.

Figure 12:
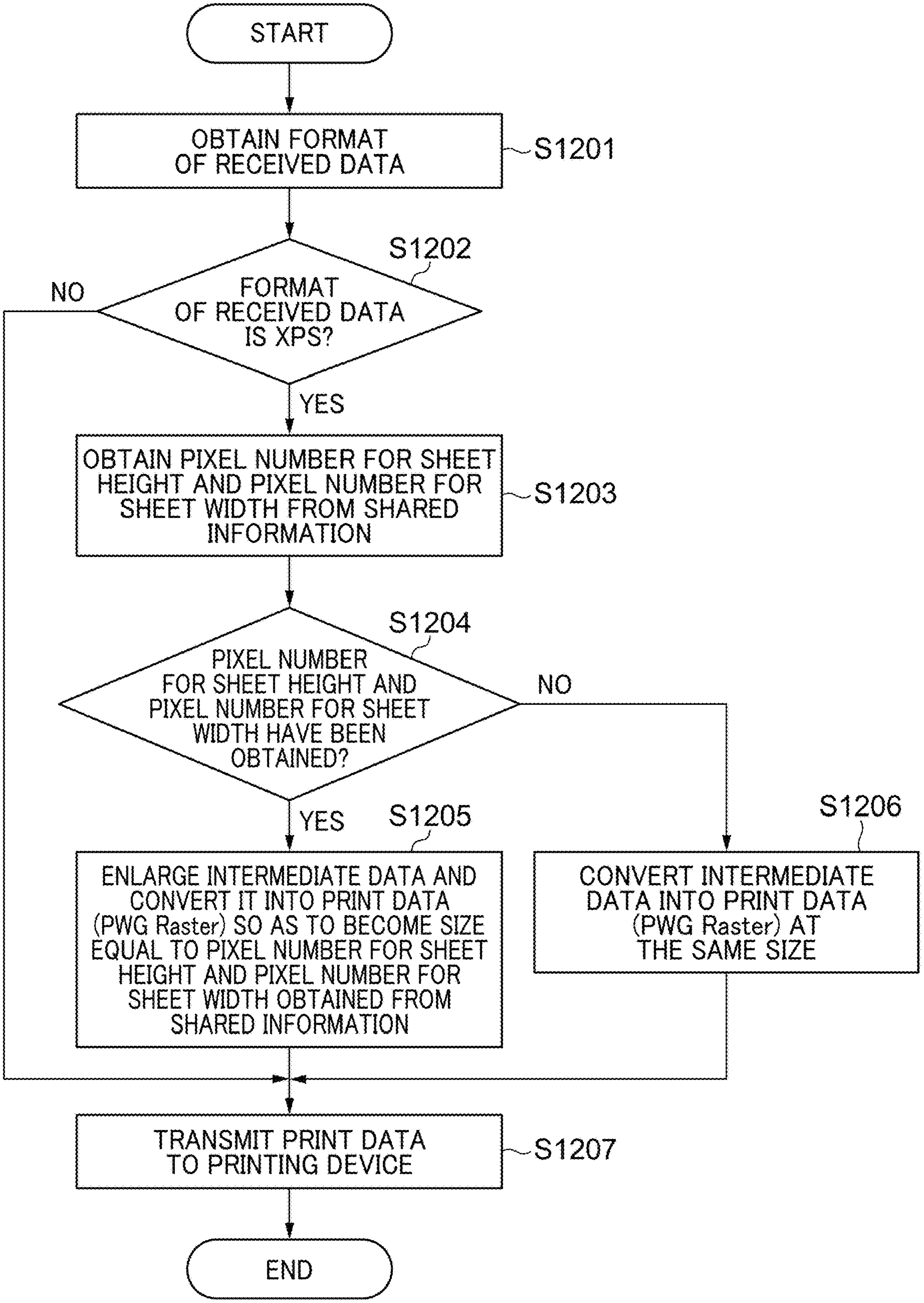
FIG. 12 is a flowchart that shows an example of a print data editing processing performed by a print data editing unit of the printing system shown in FIG. 1.

FIG. 12 is a flowchart that shows an example of a print data editing processing performed by the print data editing unit. A program based on the flowchart shown in FIG. 12 is executed by the CPU 111. In addition, the program based on the flowchart shown in FIG. 12 is started, for example, at the timing when the data (the intermediate data or the print data) received from the print data generation software 202 becomes ready to be processed (becomes processable). As shown in FIG. 12, in a step S1201, the print data editing unit 208 obtains the format of the data received from the print data generation software 202, and the processing proceeds to a step S1202.

In the step S1202, the print data editing unit 208 determines whether or not the format of the data, which is obtained in the step S1201, is XPS data. As a result of the determination performed in the step S1202, in the case of being determined that the format of the data, which is obtained in the step S1201, is XPS data, the processing proceeds to a step S1203. On the other hand, as the result of the determination performed in the step S1202, in the case of being determined that the format of the data, which is obtained in the step S1201, is not XPS data, the processing proceeds to a step S1207.

In the step S1203, the print data editing unit 208 obtains the pixel number in the height of the sheet and the pixel number in the width of the sheet from the shared information 210, and the processing proceeds to a step S1204.

In the step S1204, the print data editing unit 208 determines whether or not the pixel number in the height of the sheet and the pixel number in the width of the sheet have been obtained in the step S1203. As a result of the determination performed in the step S1204, in the case of being determined that the pixel number in the height of the sheet and the pixel number in the width of the sheet have been obtained in the step S1203, the processing proceeds to a step S1205. On the other hand, as the result of the determination performed in the step S1204, in the case of being determined that the pixel number in the height of the sheet and the pixel number in the width of the sheet have not been obtained in the step S1203, the processing proceeds to a step S1206.

In the step S1205, the print data editing unit 208 enlarges the intermediate data and converts it into the print data (PWG Raster) so as to become a size equal to the pixel number in the height of the sheet and the pixel number in the width of the sheet that have been obtained in the step S1203. It should be noted that the pixel number in the height of the sheet and the pixel number in the width of the sheet that have been obtained in the step S1203 are the pixel numbers calculated before dividing the resolution by the variable N. Therefore, through the process performed in the step S1205, the intermediate data is enlarged to a size that matches the original sheet size. After executing the step S1205, the processing proceeds to the step S1207.

In the step S1206 after executing the step S1204, the print data editing unit 208 converts the intermediate data into the print data (PWG Raster) at the same size, and the processing proceeds to the step S1207.

In the step S1207, the print data editing unit 208 transmits the print data converted in the step S1205 or the step S1206 to the printing device 102, and the processing ends.

With the printing system 100 configured as described above, in the case that the printing device 102 is capable of printing on a specific sheet size, when rendering is performed by the rendering application 201, it is possible to add the pixel number limit function that sets an upper limit on the pixel number in the height direction of the sheet. According to this pixel number limit function, when the rendering application 201 performs rendering with respect to the rendering area with a relatively large number of pixels, it is possible to suppress the rendering errors such as missing of the rendering objects (see FIG. 3C). In addition, by setting the pixel number limit function to a desired setting value by using the pixel number limit function control item 703 of the print setting screen 701 shown in FIG. 7A and FIG. 7B, it is possible to switch between enabling and disabling the pixel number limit function. For example, in the case that the setting value of the pixel number limit function is "Auto", the pixel number threshold value Tp (the rendering ability information) corresponding to the name of the rendering application 201 is automatically set. As a result, for example, in the rendering application 201 whose rendering ability is relatively low, by causing to execute rendering with a low number of pixels, it is possible to suppress the occurrence of the rendering errors. On the other hand, in the rendering application 201 whose rendering ability is relatively high, by causing to execute rendering with a high number of pixels, it is possible to obtain high-quality printing results. In addition, in the case that the rendering errors occur when printing has been executed while the setting value of the pixel number limit function is "Auto", it is possible to change the setting value of the pixel number limit function to "ON" and execute printing. As a result, it is possible to suppress the occurrence of the rendering errors. In addition, in the case that the environment is such that the rendering errors are unlikely to occur, it is preferable to set the setting value of the pixel number limit function to "OFF". As a result, it becomes possible to obtain high-quality printing results. Therefore, even in the case of using a program that runs based on, for example, the IPP, the printing system 100 is capable of suppressing the occurrence of the rendering errors in the printing device 102 regardless of the size of the print data.

Hereinafter, a second embodiment will be described with reference to FIGS. 13 to 16, but the description of the second embodiment will focus on the differences from the first embodiment described above, and the description of similar matters will be omitted. In the first embodiment, when rendering is performed by the rendering application 201, by adding the pixel number limit function that sets the upper limit on the pixel number in the height direction of the sheet, the rendering errors in the case that the rendering application 201 performs rendering with respect to the rendering area with a relatively large number of pixels have been suppressed. In the first embodiment, depending on the combination of the rendering application 201 and the sheet size, the resolution when rendering is performed by the rendering application 201 may drop significantly, and there is a possibility that printing results with the quality desired by the user may not be obtained. Therefore, in the second embodiment, a user interface capable of setting a lower limit of the resolution when the rendering application 201 performs rendering will be described.

Figure 13:
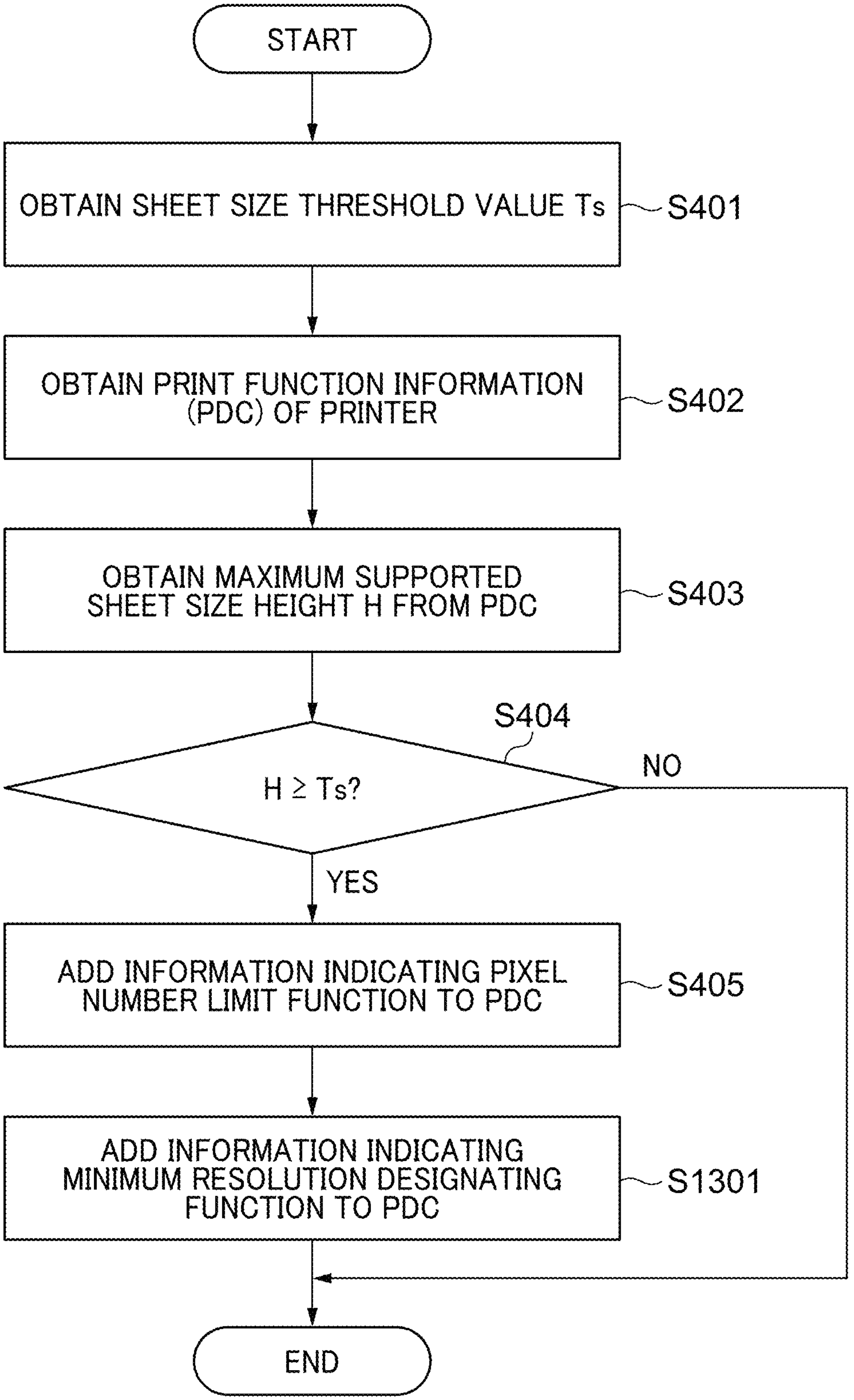
FIG. 13 is a flowchart that shows the main processing of a print function information editing processing performed by a print function extending unit of a printing system according to a second embodiment.

Next, a print function information editing processing performed by a print function extending unit of a printing system according to the second embodiment will be described. FIG. 13 is a flowchart that shows the main processing of the print function information editing processing performed by the print function extending unit of the printing system according to the second embodiment. As shown in FIG. 13, a step S1301 is executed after the step S405. In the step S1301, the print function extending unit 207 adds information indicating a minimum resolution designating function to the PDC, and the processing ends. "The minimum resolution designating function" is a function to designate (set) a minimum value of the resolution when lowering the resolution.

FIG. 14 is a diagram that shows an example of the PDC to which the information indicating the minimum resolution designating function is added. As shown in FIG. 14, information 1402 has been added to PDC 1401. The information 1402 is the information indicating the minimum resolution designating function that has been added by the process performed in the step S1301. The information 1402 indicates that None, 300 dpi, 150 dpi, and 75 dpi are settable as JobMinimum Resolution.

Figure 15A:
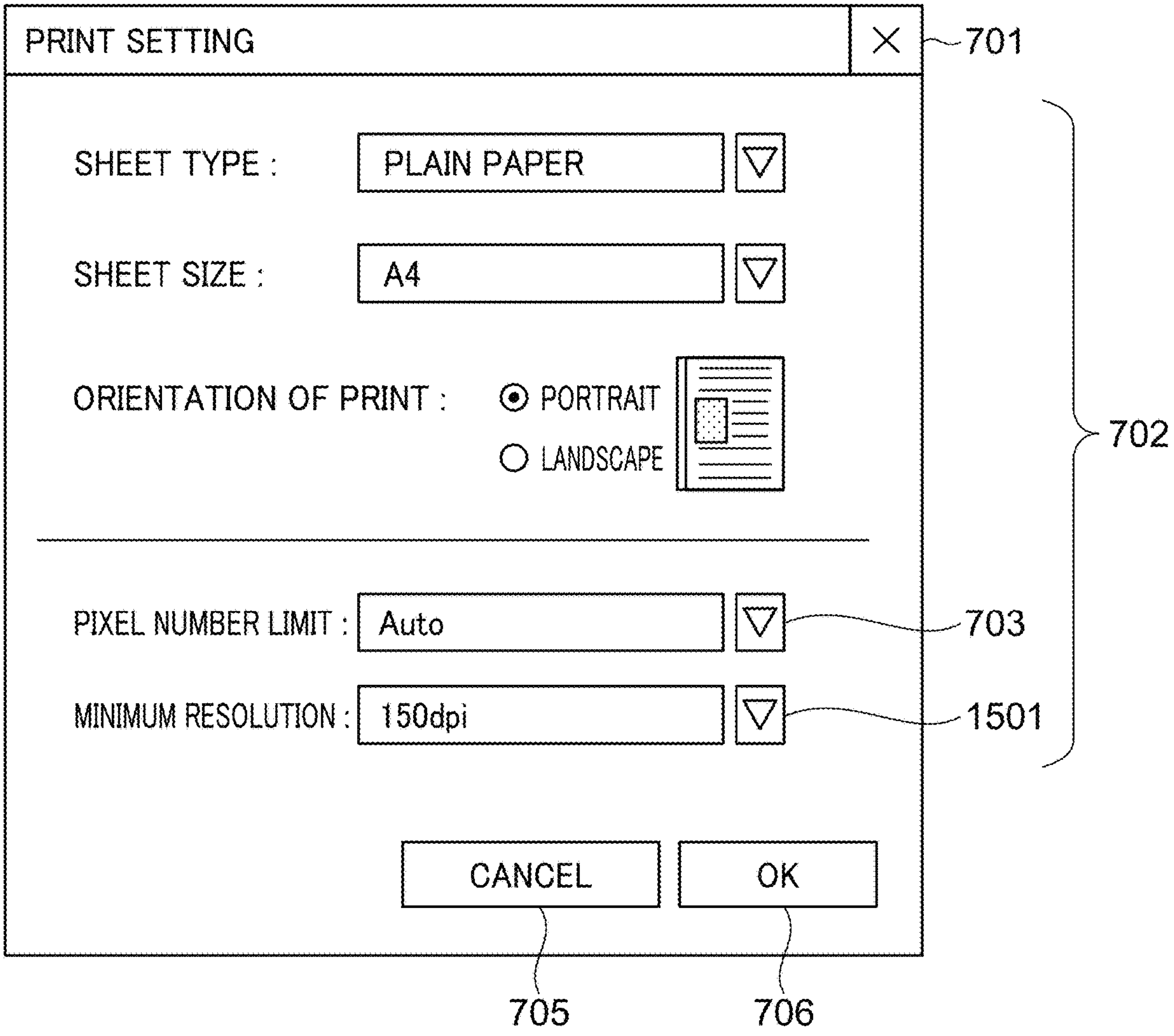
FIG. 15A and FIG. 15B are diagrams that show a print setting screen provided by a print setting screen extending unit of the printing system according to the second embodiment.
Figure 15B:
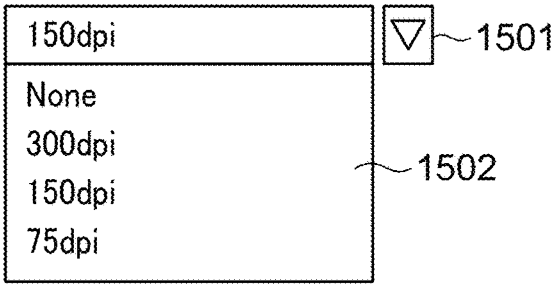

Next, a print setting screen provided by a print setting screen extending unit of the printing system according to the second embodiment will be described. FIG. 15A and FIG. 15B are diagrams that show the print setting screen provided by the print setting screen extending unit of the printing system according to the second embodiment. FIG. 15A is the diagram that shows an example of the print setting screen provided by the print setting screen extending unit of the printing system according to the second embodiment. As shown in FIG. 15A, the control items 702 include a minimum resolution designating function control item 1501. With the minimum resolution designating function control item 1501, it is possible to set t the minimum resolution designating function that has been added in the step S1301 of the flowchart shown in FIG. 13. FIG. 15B is the diagram that shows an example of the minimum resolution designating function control item and a minimum resolution designating function drop-down list for causing to select a setting value of the minimum resolution designating function. By operating the minimum resolution designating function control item 1501, a minimum resolution designating function drop-down list 1502 is displayed. The minimum resolution designating function drop-down list 1502 is a setting screen to set the minimum value of the resolution when lowering the resolution. The minimum resolution designating function drop-down list 1502 displays setting values based on the information 1402, that is, "None", "300 dpi", "150 dpi", and "75 dpi" (a displaying step). Thereby, the user is able to select a desired setting value and designate the minimum resolution.

Figure 16:
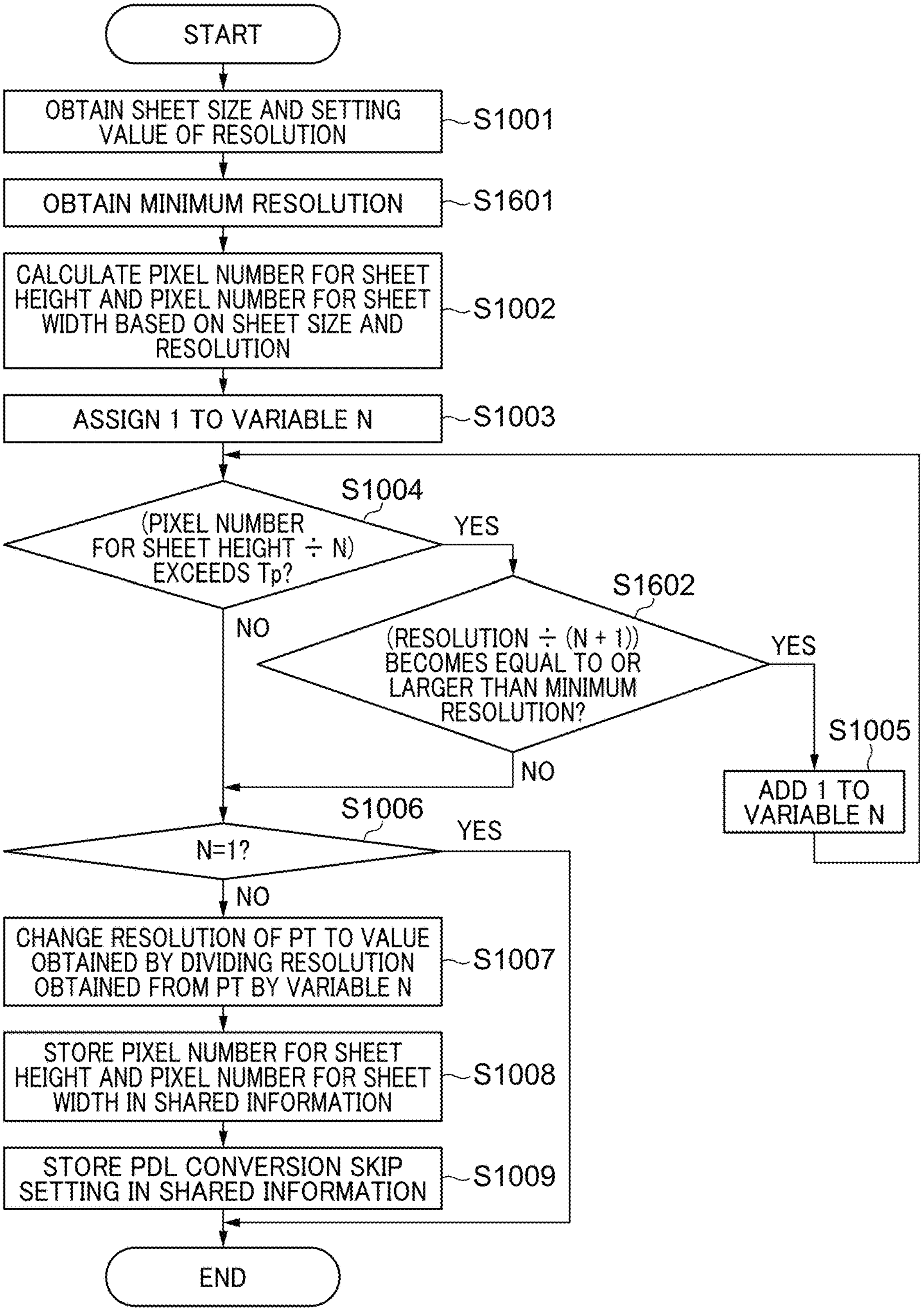
FIG. 16 is a flowchart that shows a modification of the processing performed in the step S808 (the subroutine) of the flowchart shown in FIG. 8.

Next, a print setting screen display processing performed by the print setting screen extending unit of the printing system according to the second embodiment will be described. FIG. 16 is a flowchart that shows a modification of the processing performed in the step S808 (the subroutine) of the flowchart shown in FIG. 8. As shown in FIG. 16, after executing the step S1001, the processing proceeds to a step S1601. In the step S1601, the print setting screen extending unit 205 obtains a setting value of the minimum resolution set via the minimum resolution designating function drop-down list 1502, and the processes of the steps S1002 to S1004 are sequentially executed. Then, as a result of the determination performed in the step S1004, in the case of being determined that "(the pixel number in the height of the sheet÷N)>Tp" holds, the processing proceeds to a step S1602. On the other hand, as the result of the determination performed in the step S1004, in the case of being determined that "(the pixel number in the height of the sheet÷N)>Tp" does not hold, the processing proceeds to the step S1006.

In the step S1602, the print setting screen extending unit 205 determines whether or not "((the resolution obtained in the step S1001)÷(N+1))≥the minimum resolution" holds. It should be noted that the vertical resolution can be used as the resolution obtained in the step S1001, but is not limited to this, and for example, the horizontal resolution can be used as the resolution obtained in the step S1001. As a result of the determination performed in the step S1602, in the case of being determined that "(the resolution÷(N+1))≥the minimum resolution" holds, the processing proceeds to the step S1005, and the subsequent processes are sequentially executed. On the other hand, as the result of the determination performed in the step S1602, in the case of being determined that "(the resolution÷(N+1))≥the minimum resolution" does not hold, the processing proceeds to the step S1006, and the subsequent processes are sequentially executed. It should be noted that in the case that "None" has been selected from the minimum resolution designating function drop-down list 1502, the calculation is performed assuming that the right side of "(the resolution÷(N+1))≥the minimum resolution" is 0.

In the printing system 100 configured as described above, by using the minimum resolution designating function control item 1501, it is possible to set the minimum resolution to a desired setting value. As a result, it is possible for the rendering application 201 to generate the intermediate data with a resolution equal to or higher than the minimum resolution, thus providing an excellent balance between the suppression of the rendering errors and the print quality.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-101811, filed on Jun. 21, 2023, which is hereby incorporated by reference herein in its entirety.

What is claimed is:

1. A non-transitory computer-readable storage medium storing a control program that controls an information processing apparatus that is communicably connected to a printing device, which performs printing, and is capable of processing information to and from the printing device, and causes the information processing apparatus to execute the following steps, the control program comprising software code adapted to perform processing comprising:

obtaining a sheet size threshold value and print function information, the print function information being provided from print data generation software;

obtaining a largest value among values of sheet size height from the print function information;

adding, in a case where the largest value is larger than the sheet size threshold value, information indicating a pixel number limit function to the print function information;

obtaining a pixel number corresponding to a size of a sheet-shaped print medium on which print data used in the printing is printed; and generating, in a case that the obtained pixel number is greater than or equal to a pixel number threshold value set in advance, secondary data, a volume of which is smaller than a volume of primary data, by using the print data as the primary data and lowering a resolution of the primary data.

2. The non-transitory computer-readable storage medium according to claim 1, wherein the control program is capable of exchanging information with another control program different from the control program, the another control program comprises software code adapted to perform a converting step of performing a conversion processing to convert the secondary data into data that can be printed by the printing device, and the software code of the control program is adapted to perform an omitting step of omitting the conversion processing performed in the converting step with respect to the secondary data.

3. The non-transitory computer-readable storage medium according to claim 2, wherein the software code of the control program is adapted to perform a converting step of performing a conversion processing to convert the secondary data, for which the conversion processing has been omitted, into data that can be printed by the printing device.

4. The non-transitory computer-readable storage medium according to claim 3, wherein the software code of the control program is adapted to perform a transmitting step of transmitting, to the printing device, the data that can be printed and is obtained by converting the secondary data by the conversion processing performed in the converting step.

5. The non-transitory computer-readable storage medium according to claim 2, wherein the another control program is a program that runs based on the internet printing protocol (IPP), and the control program is a program that extends functions of the another control program.

6. The non-transitory computer-readable storage medium according to claim 1, wherein in the generating step, when generating the secondary data, a pixel number of the secondary data is made less than the pixel number threshold value.

7. The non-transitory computer-readable storage medium according to claim 1, wherein the pixel number threshold value corresponds to a size of the largest print medium that can be printed by the printing device.

8. The non-transitory computer-readable storage medium according to claim 1, wherein a plurality of the pixel number threshold values are prepared, and in the generating step, one pixel number threshold value is selected from the plurality of the pixel number threshold values.

9. The non-transitory computer-readable storage medium according to claim 1, wherein the software code of the control program is further adapted to perform processing comprising:

determining, prior to the generating step, whether or not the pixel number is greater than or equal to the pixel number threshold value; and causing the information processing apparatus to display a switching screen that switches whether or not to enable execution of a determination in the determining step.

10. The non-transitory computer-readable storage medium according to claim 1, wherein the software code of the control program is further adapted to perform processing comprising: causing the information processing apparatus to display a setting screen that sets a minimum value of the resolution when lowering the resolution.

11. The non-transitory computer-readable storage medium according to claim 1, wherein the print medium has a rectangular shape in a plan view, and in the obtaining of the pixel number, a length along a long side direction of the print medium is obtained as the size of the print medium.

12. The non-transitory computer-readable storage medium according to claim 1, wherein the print function information includes information of sheet sizes supported by the printing device, the information of sheet sizes including a plurality of sheet size height values, and wherein the largest value is obtained from among the plurality of sheet size height values.

13. The non-transitory computer-readable storage medium according to claim 1, wherein the print function information is print device capabilities generated by the print data generation software based on attribute information obtained from the printing device.

14. The non-transitory computer-readable storage medium according to claim 13, wherein the attribute information is included in a response obtained by issuing an Internet Printing Protocol Get-Printer-Attributes operation to the printing device.

15. The non-transitory computer-readable storage medium according to claim 1, wherein, in a case where the largest value is not larger than the sheet size threshold value, the information indicating the pixel number limit function is not added to the print function information.

16. The non-transitory computer-readable storage medium according to claim 1, wherein the information indicating the pixel number limit function includes a feature for setting the pixel number limit function and options including Auto, ON, and OFF.

17. The non-transitory computer-readable storage medium according to claim 16, wherein the control program causes a print setting screen to display a control item for the pixel number limit function based on the information indicating the pixel number limit function added to the print function information.

18. The non-transitory computer-readable storage medium according to claim 16, wherein, when Auto is selected, the pixel number threshold value is selected in accordance with a name of rendering application software, when ON is selected, a predetermined pixel number threshold value is used regardless of the name of the rendering application software, and when OFF is selected, the pixel number limit function is disabled.

19. A control method for controlling an information processing apparatus that is communicably connected to a printing device, which performs printing, and is capable of processing information to and from the printing device, the control method comprising:

obtaining a sheet size threshold value and print function information, the print function information being provided from print data generation software;

obtaining a largest value among values of sheet size height from the print function information;

adding, in a case where the largest value is larger than the sheet size threshold value, information indicating a pixel number limit function to the print function information;

obtaining a pixel number corresponding to a size of a sheet-shaped print medium on which print data used in the printing is printed; and generating, in a case that the obtained pixel number is greater than or equal to a pixel number threshold value set in advance, secondary data, a volume of which is smaller than a volume of primary data, by using the print data as the primary data and lowering a resolution of the primary data.

20. An information processing apparatus that is communicably connected to a printing device, which performs printing, and is capable of processing information to and from the printing device, the information processing apparatus comprising:

at least one processor; and a memory coupled to the processor storing instructions that, when executed by the processor, cause the processor to perform processing comprising:

obtaining a sheet size threshold value and print function information, the print function information being provided from print data generation software;

obtaining a largest value among values of sheet size height from the print function information;

adding, in a case where the largest value is larger than the sheet size threshold value, information indicating a pixel number limit function to the print function information;

obtaining a pixel number corresponding to a size of a sheet-shaped print medium on which print data used in the printing is printed; and generating, in a case that the obtained pixel number is greater than or equal to a pixel number threshold value set in advance, secondary data, a volume of which is smaller than a volume of primary data, by using the print data as the primary data and lowering a resolution of the primary data.

* * * * *